United States Patent
Israel et al.

(10) Patent No.: US 11,880,741 B2
(45) Date of Patent: Jan. 23, 2024

(54) SYSTEMS AND METHODS FOR EMBEDDING PROBLEMS INTO AN ANALOG PROCESSOR

(71) Applicant: D-WAVE SYSTEMS INC., Burnaby (CA)

(72) Inventors: Robert B. Israel, Richmond (CA); Trevor M. Lanting, Vancouver (CA); Andrew D. King, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 777 days.

(21) Appl. No.: 16/988,232

(22) Filed: Aug. 7, 2020

(65) Prior Publication Data
US 2020/0372393 A1    Nov. 26, 2020

Related U.S. Application Data

(62) Division of application No. 15/487,295, filed on Apr. 13, 2017, now Pat. No. 10,789,540.
(Continued)

(51) Int. Cl.
*G06N 10/00* (2022.01)
*G06N 20/00* (2019.01)
*G06N 3/126* (2023.01)

(52) U.S. Cl.
CPC .............. *G06N 10/00* (2019.01); *G06N 3/126* (2013.01); *G06N 20/00* (2019.01)

(58) Field of Classification Search
CPC ......... G06N 10/00; G06N 3/126; G06N 20/00
See application file for complete search history.

(56) References Cited

U.S. PATENT DOCUMENTS

| 5,113,352 A | 5/1992 | Finnerty |
| 6,838,694 B2 | 1/2005 | Esteve et al. |

(Continued)

FOREIGN PATENT DOCUMENTS

| JP | 2010233066 A | 10/2010 |
| WO | 2006066415 A1 | 6/2006 |

(Continued)

OTHER PUBLICATIONS

Gaitan, Frank, and Lane Clark. "Graph isomorphism and adiabatic quantum computing." Physical Review A 89.2 (2014): 022342. (Year: 2014).*

(Continued)

*Primary Examiner* — Michael J Huntley
*Assistant Examiner* — Sehwan Kim
(74) *Attorney, Agent, or Firm* — Cozen O'Connor

(57) ABSTRACT

Generate an automorphism of the problem graph, determine an embedding of the automorphism to the hardware graph and modify the embedding of the problem graph into the hardware graph to correspond to the embedding of the automorphism to the hardware graph. Determine an upper-bound on the required chain strength. Calibrate and record properties of the component of a quantum processor with a digital processor, query the digital processor for a range of properties. Generate a bit mask and change the sign of the bias of individual qubits according to the bit mask before submitting a problem to a quantum processor, apply the same bit mask to the bit result. Generate a second set of parameters of a quantum processor from a first set of parameters via a genetic algorithm.

12 Claims, 12 Drawing Sheets

Related U.S. Application Data

(60) Provisional application No. 62/324,206, filed on Apr. 18, 2016.

(56) References Cited

U.S. PATENT DOCUMENTS

| | | |
|---|---|---|
| 6,988,058 B1 | 1/2006 | Sherwin et al. |
| 7,135,701 B2 | 11/2006 | Amin et al. |
| 7,418,283 B2 | 8/2008 | Amin |
| 7,533,068 B2 | 5/2009 | Maassen et al. |
| 7,788,192 B2 | 8/2010 | Amin |
| 7,843,209 B2 | 11/2010 | Berkley |
| 7,870,087 B2 | 1/2011 | Macready et al. |
| 7,876,248 B2 | 1/2011 | Berkley et al. |
| 7,877,333 B2 | 1/2011 | Macready |
| 7,984,012 B2 | 7/2011 | Coury et al. |
| 8,008,942 B2 | 8/2011 | Van et al. |
| 8,018,244 B2 | 9/2011 | Berkley |
| 8,032,474 B2 | 10/2011 | Macready et al. |
| 8,035,540 B2 | 10/2011 | Berkley et al. |
| 8,073,808 B2 | 12/2011 | Rose |
| 8,098,179 B2 | 1/2012 | Bunyk et al. |
| 8,169,231 B2 | 5/2012 | Berkley |
| 8,174,305 B2 | 5/2012 | Harris |
| 8,175,995 B2 | 5/2012 | Amin |
| 8,190,548 B2 | 5/2012 | Choi |
| 8,195,596 B2 | 6/2012 | Rose et al. |
| 8,244,662 B2 | 8/2012 | Coury et al. |
| 8,421,053 B2 | 4/2013 | Bunyk et al. |
| 8,700,689 B2 | 4/2014 | Macready et al. |
| 9,129,224 B2 | 9/2015 | Lanting et al. |
| 9,170,278 B2 | 10/2015 | Neufeld |
| 9,178,154 B2 | 11/2015 | Bunyk |
| 9,183,508 B2 | 11/2015 | King |
| 9,424,526 B2 | 8/2016 | Ranjbar |
| 9,501,474 B2 | 11/2016 | Gopalakrishnan |
| 9,501,747 B2 | 11/2016 | Roy |
| 9,710,758 B2 | 7/2017 | Bunyk et al. |
| 9,881,256 B2 | 1/2018 | Hamze et al. |
| 10,002,107 B2 | 6/2018 | Lanting |
| 10,552,755 B2 | 2/2020 | Lanting et al. |
| 10,789,540 B2 | 9/2020 | King et al. |
| 11,023,821 B2 | 6/2021 | Harris et al. |
| 2002/0190249 A1 | 12/2002 | Williams et al. |
| 2003/0055513 A1 | 3/2003 | Raussendorf et al. |
| 2005/0082519 A1 | 4/2005 | Amin et al. |
| 2005/0167658 A1 | 8/2005 | Williams et al. |
| 2005/0250651 A1 | 11/2005 | Amin et al. |
| 2005/0262179 A1 | 11/2005 | Tucci |
| 2006/0147154 A1 | 7/2006 | Thom et al. |
| 2008/0052055 A1 | 2/2008 | Rose et al. |
| 2008/0086438 A1 | 4/2008 | Amin et al. |
| 2008/0176750 A1 | 7/2008 | Rose et al. |
| 2008/0218519 A1 | 9/2008 | Coury et al. |
| 2008/0238531 A1 | 10/2008 | Harris |
| 2008/0258753 A1 | 10/2008 | Harris |
| 2009/0241013 A1 | 9/2009 | Roetteler |
| 2011/0018612 A1 | 1/2011 | Harris |
| 2011/0022820 A1 | 1/2011 | Bunyk et al. |
| 2011/0057169 A1 | 3/2011 | Harris et al. |
| 2011/0060711 A1 | 3/2011 | Macready et al. |
| 2011/0231462 A1 | 9/2011 | Macready et al. |
| 2011/0238607 A1 | 9/2011 | Coury et al. |
| 2012/0094838 A1 | 4/2012 | Bunyk et al. |
| 2013/0005580 A1 | 1/2013 | Bunyk et al. |
| 2014/0187427 A1 | 7/2014 | Macready et al. |
| 2014/0250288 A1* | 9/2014 | Roy .................. G06N 5/01 712/223 |
| 2014/0324933 A1 | 10/2014 | Macready et al. |
| 2015/0032993 A1* | 1/2015 | Amin .................. G06N 10/00 712/42 |
| 2018/0246848 A1 | 8/2018 | Douglass et al. |
| 2019/0019101 A1* | 1/2019 | Neven .................. G06N 5/01 |
| 2022/0391744 A1 | 12/2022 | Boothby et al. |

FOREIGN PATENT DOCUMENTS

| | | |
|---|---|---|
| WO | 2009039634 A1 | 4/2009 |
| WO | 2009143166 A2 | 11/2009 |
| WO | 2012064974 A2 | 5/2012 |
| WO | 2013006836 A1 | 1/2013 |
| WO | 2017075246 A1 | 5/2017 |

OTHER PUBLICATIONS

King, Andrew D., and Catherine C. McGeoch. "Algorithm engineering for a quantum annealing platform." arXiv preprint arXiv:1410.2628 (2014). (Year: 2014).*

Choi, Vicky. "Minor-embedding in adiabatic quantum computation: I. The parameter setting problem." Quantum Information Processing 7 (2008): 193-209. (Year: 2008).*

Trummer, Immanuel, and Christoph Koch. "Multiple query optimization on the D-Wave 2X adiabatic quantum computer." arXiv preprint arXiv:1510.06437 (2015). (Year: 2015).*

Almeida, J. et al., "Probing Quantum Coherence in Qubit Arrays," J. Phys. B: At. Mol. Opt. Phys. vol. 46, 2013, 8 pages.

Amin et al., "Systems and Methods for Achieving Orthogonal Control of Non-Orthogonal Qubit Parameters," U.S. Appl. No. 61/857,601, filed Jul. 23, 2013, 89 pages.

Amin, "Effect of Local Minima on Adiabatic Quantum Optimization," Physical Review Letters 100(130503), 2008, 4 pages.

Bian et al., "Discrete optimization using quantum annealing on sparse Ising models", Frontiers in Physics, Sep. 18, 2014.

Blatter et al., "Design aspects of superconducting-phase quantum bits," Physical Review B 63: 174511-1-174511-9, 2001.

Boros et al., "Local search heuristics for Quadratic Unconstrained Binary Optimization (QUBO)", Springer, Feb. 21, 2007.

Bunyk, "D-Wave processor control circuitry", 2009.

Choi, "Minor-embedding in adiabatic quantum computation: II. Minor-universal graph design", Springer, Oct. 13, 2010.

Farhi et al., "Quantum Adiabatic Evolution Algorithms versus Simulated Annealing," MIT-CTP #3228, arXiv:quant-ph/0201031 v1, pp. 1-16, Jan. 8, 2002.

Feynman, "Simulating Physics with Computers," International Journal of Theoretical Physics 21(6/7): 467-488, 1982.

Harris et al., "Phase transitions in a programmable quantum spin glass simulator", Science, Jul. 13, 2018.

Harris et al., "Experimental Demonstration of a Robust and Scalable Flux Qubit," arXiv:0909.4321v1, Sep. 24, 2009, 20 pages.

Heckmann et al., "Optimal Embedding of Complete Binary Trees into Lines and Grids", Lecture Notes in in Computer Science 2269, 1991.

Il'ichev et al., "Continuous Monitoring of Rabi Oscillations in a Josephson Flux Qubit," Physical Review Letters 91(9):097906-1-097906-4, week ending Aug. 29, 2003.

International Search Report and Written Opinion, dated Nov. 7, 2014, for corresponding International Application No. PCT/US2014/047874, 13 pages.

Klymko et al., "Adiabatic Quantum Programming: Minor Embedding With Hard Faults", arXiv, Nov. 7, 2012.

Layeb et al., "A New Quantum Evolutionary Local Search Algorithm for MAX 3-SAT Problem", Springer, 2008.

Lechner et al., "A quantum annealing architecture with all-to-all connectivity from local interactions", Science Advances. Oct. 23, 2015. https://advances.sciencemag.org/content/1/9/e1500838.

Levitov, et al., "Quantum Spin Chains and Majorana States in Arrays of Coupled Qubits," arXiv:cond-mat/0108266v2 [cond-mat.mes-hall]. Aug. 19, 2001, 7 pages.

Lyakhov et al., "Quantum State Transfer in Arrays of Flux Qubits," arXiv:cond-mat/0509478v1 [cond-mat.mes-hall], Sep. 19, 2005, 10 pages.

Merrill et al, "Scalable GPU Graph Traversal", Nvidia, Feb. 1, 2012.

Mutzel, "Optimization in graph drawing", Technische Universitat Wien, 2002.

Nielsen et al., Quantum Computation and Quantum Information, Cambridge University Press, Cambridge, 2000, "7.8 Other implementation schemes," pp. 343-345.

(56) References Cited

OTHER PUBLICATIONS

Paauw, F.G., et al., "Tuning the Gap of a Superconducting Flux Qubit," arXiv:0812.1912v1 [cond-mat.supr-con] Dec. 10, 2008, 4 pages.
Pearson, "On lines and planes of closest fit to systems of points in space", Taylor and Francis Online, Jun. 8, 2010.
Rocchetto et al., "Stabilizers as a design tool for new forms of the Lechner-Hauke-Zoller annealer", Science Advances, Oct. 21, 2016.
Roy et al., "CRISP: Congestion reduction by iterated spreading during placement", IEEE, Dec. 28, 2009.
Shields et al., "Area efficient layouts of binary trees in grids", ACM Digital Library, 2001.
Shor, "Introduction to Quantum Algorithms," AT&T Labs— Research, arXiv:quant-ph/0005003 v2, pp. 1-17, Jul. 6, 2001.
Tabia, "Quantum Computing with Cluster States," 2011, retrieved from http://www.perimertinstitute.ca/personal/gtabia/notes/clusterStateQC.pdf, 18 pages.
Venturelli et al., "Quantum Optimization of Fully-Connected Spin Glasses", arXiv, Jun. 29, 2014.
Young et al., "Adiabatic quantum optimization with the wrong Hamiltonian", arXiv, Oct. 2, 2013.
Bocko et al., "Prospects for Quantum Coherent Computation Using Superconducting Electronics," IEEE Transactions on Applied Superconductivity 7(2):3638-3641, Jun. 1997.
Bunyk, "Quantum Processor With Instance Programmable Qubit Connectivity," U.S. Appl. No. 61/983,370, filed Apr. 23, 2014, 53 pages.
Chittineni et al., "Optimal Parameter Selection for Unsupervised Neural Network Using Genetic Algorithm," International Journal of Computer Science, Engineering and Applications (IJCSEA) 3(5):13-27, 2013.
Choi, Vicky. "Minor-embedding in adiabatic quantum computation: I. The parameter setting problem." Quantum Information Processing 7.5 (2008): 193-209. (Year: 2008).
Clarke et al., "Superconducting quantum bits," Nature 453:1031-1042, Jun. 19, 2008.
Conlon, David "An Extremal Theorem in the Hypercube," The Electronic Journal of Combinations 17:1 (2010), 6 pages.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
Douglass et al., "Systems, Devices, Articles, and Methods for Quantum Processor Architecture," U.S. Appl. No. 62/114,406, filed Feb. 10, 2015, 105 pages.
Friedman et al., "Quantum superposition of distinct macroscopic states," Nature 406:43-46, Jul. 6, 2000.
Gaitan, Frank, and Lane Clark. "Graph isomorphism and adiabatic quantum computing." Physical Review A 89.2 (2014): 022342. (Year: 2014).
Hamze et al., "Systems and Methods for Problem Solving Via Solvers Employing Problem Modification," U.S. Appl. No. 62/040,643, filed Aug. 22, 2014, 80 pages.
Harris et al., "Experimental Investigation of an Eight-Qubit Unit Cell in a Superconducting Optimization Processor," arXiv:1004.1628v2, Jun. 28, 2010, 16 pages.
International Search Report, dated Dec. 2, 2016, for PCT/US2016/015100, 3 pages.
King et al., "Systems and Methods for Embedding Problems Into an Analog Processor," U.S. Appl. No. 62/324,206, filed Apr. 18, 2016, 51 pages.
King, "Systems and Devices for Quantum Processor Architectures," U.S. Appl. No. 61/863,360, filed Aug. 7, 2013, 37 pages.
Lanting et al., "Systems and Methods for Increasing the Energy Scale of a Quantum Processor," U.S. Appl. No. 61/858,023, filed Jul. 24, 2013, 49 pages.
Lanting et al., "Systems and Methods for Improving the Performance of a Quantum Processor by Shimming to Reduce Intrinsic/Control Errors," U.S. Appl. No. 62/040,890, filed Aug. 22, 2014, 122 pages.
Lanting, "Systems and Methods for Removing Couplings Between Quantum Devices," U.S. Appl. No. 61/951,708, filed Mar. 12, 2014, 38 pages.
Makhlin et al., "Quantum-state engineering with Josephson-junction devices," Reviews of Modern Physics 73(2):357-400, Apr. 2001.
Martinis, "Superconducting phase qubits," Quantum Inf Process 8:81-103, 2009.
Mooij et al., "Josephson Persistent-Current Qubit," Science 285:1036-1039, Aug. 13, 1999.
Orlando et al., "Superconducting persistent-current qubit," Physical Review B 60(22): 15398-15413, Dec. 1, 1999.
Perdomo-Ortiz et al., "A Performance Estimator for Quantum Annealers: Gauge Selection and Parameter Setting.," arXiv:1503.01083v1 [quant-ph], Mar. 3, 2015, 10 pages.
Written Opinion, dated Dec. 2, 2016, for PCT/US2016/015100, 14 pages.
Zagoskin et al., "Superconducting Qubits," La Physique au Canada 63(4):215-227, 2007.
Harris et al., "A Compound Josephson Junction Coupler for Flux Qubits With Minimal Crosstalk," arXiv:0904.3784v1 [cond-mat.supr-con], Apr. 24, 2009, 4 pages.
Non Final Office Action for U.S. Appl. No. 17/234,469, dated May 1, 2023, 19 pages.
Boothby et al, "Fast Clique Minor Generation in Chimera Qubit Connectivity Graphs", arXiv:1507.04774v1, 2015.

\* cited by examiner

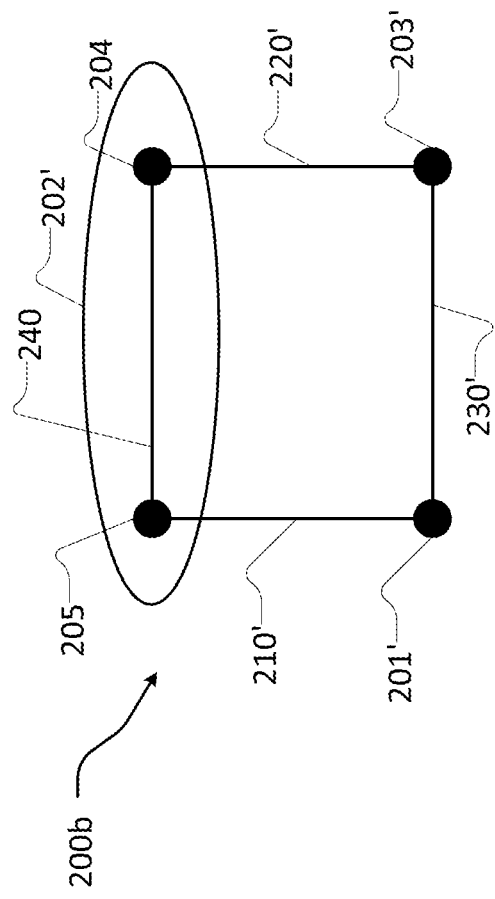
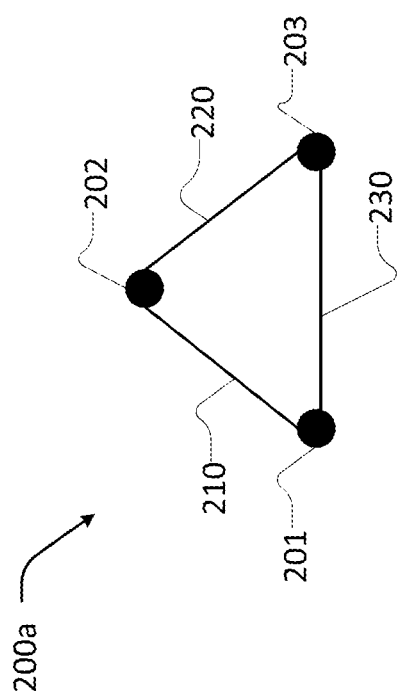
FIGURE 2A
FIGURE 2B

SYSTEMS AND METHODS FOR EMBEDDING PROBLEMS INTO AN ANALOG PROCESSOR

FIELD

The disclosure relates to systems and methods for embedding problem graphs into the hardware graph of an analog processor, in particular a quantum processor.

BACKGROUND

At least some analog processors (e.g., quantum processors) provide a plurality of analog computation devices (e.g., qubits) which are controllably coupled to each other by couplers. Analog processors may take many forms, such as quantum processors having a number of qubits and associated local bias devices, exemplary embodiments of which are described in, for example, U.S. Pat. Nos. 7,533,068, 8,008,942, 8,195,596, 8,190,548, and 8,421,053. Such quantum processors may operate, for example, via quantum annealing and/or may operate adiabatically. For the sake of convenience, the following disclosure refers generally to "qubits" and "quantum processors", although those skilled in the art will appreciate that this disclose may be implemented in systems comprising other analog processors.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of directly communicably coupling to up to three other qubits without any intervening qubits. In other words, there are direct communicative coupling paths available to three other qubits, although in any particular application all or less than all of those communicative coupling paths may be employed. In a quantum processor employing coupling devices between qubits, this would mean a qubit having a connectivity of three is selectively communicably coupleable to each of three other qubits via a respective one of three coupling devices or couplers. Typically, the number of qubits in a quantum processor limits the size of problems that may be solved and the connectivity between the qubits in a quantum processor limits the complexity of the problems that may be solved.

Many techniques for using adiabatic quantum computation and/or quantum annealing to solve computational problems involve finding ways to directly map a representation of a problem to the quantum processor itself. For example, in some approaches problems are solved by casting the problem in an intermediate formulation (e.g., as an Ising spin glass problem or as a quadratic unconstrained binary optimization ("QUBO") problem) which accommodates the number of qubits and/or connectivity constraints in the particular quantum processor and may be mapped directly to the particular quantum processor being employed. Examples of some direct mapping approaches are discussed in greater detail in, for example, US Patent Publication 2008-0052055 and U.S. Pat. No. 8,073,808.

The approach of re-casting a problem in an intermediate formulation and directly mapping the intermediate formulation to the quantum processor can be impractical for some types of problems. For example, a quantum processor with pair-wise interactions between qubits may be well-suited to solving quadratic problems (e.g., QUBO problems), but if the quantum processor lacks higher-order (i.e., more than pairwise) interactions between qubits, then casting a generic computational problem as a QUBO problem may require casting the generic computational problem in a form having only pair-wise interactions between qubits. Higher-order interactions in the original problem may need to be broken down into pair-wise terms in order to be re-cast in QUBO form, which may require significant pre-processing. In some cases, the pre-processing required to re-cast a generic problem in QUBO form and directly map the corresponding QUBO problem to a pairwise-connected quantum processor can be of similar computational complexity to the original problem. Furthermore, breaking down higher-order interactions into pair-wise terms can force multiple qubits to be used to represent the same variable, meaning the scope of problems that can be solved by a particular processor may be reduced.

Such "direct mapping" techniques for interacting with quantum processors limit the type, size, and complexity of problems that can be solved. There is a need in the art for techniques of using quantum processors that are less dependent on the architecture (also referred to herein as the topology) of the processors themselves and enable a broader range of problems to be solved.

Quantum Devices

Quantum devices are structures in which quantum mechanical effects are observable. Quantum devices include circuits in which current transport is dominated by quantum mechanical effects. Such devices include spintronics, and superconducting circuits. Both spin and superconductivity are quantum mechanical phenomena. Quantum devices can be used for measurement instruments, in computing machinery, and the like.

Quantum Computation

A quantum computer is a system that makes direct use of at least one quantum-mechanical phenomenon, such as, superposition, tunneling, and entanglement, to perform operations on data. The elements of a quantum computer are qubits. Quantum computers can provide speedup for certain classes of computational problems such as computational problems simulating quantum physics.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and A(t), B(t) are coefficients that can control the rate of evolution, and typically lie in the range [0,1].

In some implementations, a time varying envelope function can be placed on the problem Hamiltonian. A suitable delocalization Hamiltonian is given by:

$$H_D \propto -\frac{1}{2}\sum_{i=1}^{N} \Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z\sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\varepsilon$ is some characteristic energy scale for $H_P$.

Here, the $\sigma_i^z$ and $\sigma_i^z\sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

BRIEF SUMMARY

An aspect of the present disclosure provides methods for use in embedding a problem into an analog processor. The problem is represented as a problem graph having a number of decision variables and the analog processor is represented as a hardware graph having a number of vertices coupleable via a number of edges. The problem graph is mapped into the hardware graph via a first embedding and the embedding contains at least one chain having a first chain strength. The method includes generating a first automorphism of the problem graph, determining an embedding of the first automorphism to the hardware graph and modifying the first embedding of the problem graph into the hardware graph to generate a first modified embedding such that the modified first embedding corresponds to the composition of the first embedding and the embedding of the first automorphism of the problem graph to the hardware graph.

The method may include determining whether the at least one chain is not broken in a ground state of the embedded problem corresponding to the first modified embedding. The at least one chain has a first modified chain strength which may represent a lower chain strength than the first chain strength.

The method may include generating a second automorphism of the problem graph and modifying the first modified embedding of the problem graph to the hardware graph to generate a second modified embedding such that the second modified embedding corresponds to a composition of the first embedding and an embedding of the second automorphism of the problem graph to the hardware graph. The method may include determining whether the at least one chain is not broken in a ground state of the embedded problem corresponding to the second modified embedding. The at least one chain strength has a second modified chain strength which may represent a lower chain strength than the first modified chain strength.

The method may include determining whether the at least one chain strength represents a minimal chain strength requirement and querying a hardware solver to determine the required chain strength.

The method may include determining whether the at least one chain strength represents a lower chain strength and finding an upper-bound on the required chain strength by verifying that for each chain C of the embedded problem $-J(e)>b(C, e)$ is respected for each edge e in C. $b(C, e)$ is defined as $b(C, e):=\min\{b(C_1(e)), b(C_2(e))\}$, where $b(C):=\Sigma_{v\in C}|h(v)|+\Sigma_{v\in C}\Sigma_{u\in U_v}|J(v, u)|$ and $J(e)$ is the coupling strength applied to edge e.

The method may include refining the upper bound on the required chain strength by calculating the maximum $\varepsilon>0$ for which, with the coupling $J(e)+\varepsilon$ applied to all edges e of chain C, chain C is respected in every ground state for all possible spin configurations of the neighbors of C. The method may include modifying the couplings in C by reducing the strength by $\varepsilon$. The method may include generating a plurality of automorphisms of the problem graph and modifying the first embedding of the problem graph into the hardware graph to generate a plurality of modified embeddings. Each modified embedding corresponds to the composition of the first embedding and an embedding of each of the plurality of automorphisms of the problem graph until the at least one chain is not broken in a ground state of the embedded problem corresponding to one of the plurality of the modified embeddings and the at least one chain strength is lower than all or most of the previously produced chain strengths.

A hybrid computing system comprises an analog processor and a non-analog processor in communication with each other. The problem is represented as a problem graph having a number of decision variables and the analog processor is represented as a hardware graph having a number of vertices coupleable via a number of edges. The problem graph is mapped into the hardware graph via an embedding and the embedding contains at least one chain having a first chain strength. The non-analog processor generates a first automorphism of the problem graph, determines an embedding of the first automorphism to the hardware graph and modifies the first embedding of the problem graph into the hardware graph to produce a first modified embedding. The first modified embedding corresponds to a composition of the first embedding and the embedding of the first automorphism of the problem graph to the hardware graph.

The hybrid computing system may determine whether the at least one chain is not broken in a ground state of the embedded problem corresponding to the first modified embedding. The at least one chain strength has a first modified chain strength which may represent a lower chain strength than the first chain strength.

The hybrid computing system may generate a second automorphism of the problem graph and may modify the first modified embedding of the problem graph to the hardware graph to generate a second modified embedding. The second modified embedding corresponds to a composition of the first embedding and an embedding of the second automorphism of the problem graph to the hardware graph. The hybrid computing system may determine whether the at least one chain is not broken in a ground state of the embedded problem corresponding to the mapping of the second automorphism of the problem graph to the hardware graph. The at least one chain strength has a second modified chain strength which may represent a lower chain strength than the first modified chain strength.

The hybrid computing system may determine whether the at least one chain strength represents a lower chain strength and may find an upper-bound on the required chain strength by verifying that for each chain C of the embedded problem $-J(e) > b(C, e)$ is respected for each edge e in C. $b(C, e)$ is defined as $b(C, e) := \min\{b(C_1(e)), b(C_2(e))\}$, where $b(C) := \Sigma_{v \in C}|h(v)| + \Sigma_{v \in C}\Sigma_{u \in U_v}|J(v, u)|$ and $J(e)$ is the coupling strength applied to edge e.

The hybrid computing system may refine the upper bound on the required chain strength by calculating the maximum $\varepsilon > 0$ for which, with the coupling $J(e) + \varepsilon$ applied to all edges e of chain C, chain C is respected in every ground state for all possible spin configurations of the neighbors of C. The hybrid computing system may modify the couplings in C by reducing the strength by $\varepsilon$.

The hybrid computing system may successively generate a plurality of automorphisms of the problem graph and modify the first embedding graph to generate a plurality of modified embeddings. Each modified embedding corresponds to a composition of the first embedding and an embedding of each of the plurality of automorphisms of the problem graph until the at least one chain is not broken in a ground state of the embedded problem and the at least one chain strength is lower than all or most of the previously produced chain strengths.

An aspect of the present disclosure provides methods for use in embedding a problem into a quantum processor. The quantum processor comprises a number qubits coupleable via coupling devices. Each of the qubits and coupling devices has at least one measurable property. The method includes calibrating at least a portion of the quantum processor, recording a value for the at least one measurable property of each calibrated qubit and coupling device using a digital processor, generating a query by specifying a range based on the value of the at least one measurable property and submitting the query to the digital processor. The digital processor returns a first set of qubits and coupling devices that satisfy the query. The method includes submitting a problem to the quantum processor using the first set of qubits and coupling devices.

In some implementations, the at least one measurable property may be selected from a group consisting of the following properties: dead/alive status, h range, j range, DAC precision, distance to qubit with properties already recorded, position on the quantum processor.

In some implementations, recording a value for the at least one measurable property of each qubit and coupling device using a digital processor may include recording a value for the at least one measurable property of each qubit and coupling device using a database.

The method may include re-submitting the query to the digital processor. The digital processor returns a second set of qubits and coupling devices that satisfy the query and the second set is different from the first set.

Some aspects of the present disclosure provide methods for use in embedding a problem into a quantum processor. The quantum processor has a number of qubits coupleable via coupling devices and the problem has a number of decision variables. The method includes generating a bit mask of length corresponding to the number of decision variables in the problem and applying the bit mask to the qubits. The sign of the bias applied to a qubit is reversed according to the bit mask. The method includes submitting the problem to the quantum processor and computing a bit result with the quantum processor. The bit mask is applied to the bit result. The sign of a bit is reversed according to the bit mask to obtain a solution to the original problem.

Some aspects of the present disclosure provide methods for parameter selection in an analog processor. The analog processor has a first set of tunable parameters. The method includes estimating the fitness of the first set of tunable parameters and generating a second set of tunable parameters from the first set of tunable parameters using a genetic algorithm. The genetic algorithm evolves the tunable parameters via mutation, inheritance or permutation. The second set is different from the first set.

In some implementations, the analog processor includes a quantum processor.

The method may include estimating the fitness of the second set of tunable parameters and generating a third set of tunable parameters using a genetic algorithm. The genetic algorithm evolves the tunable parameters via mutation, inheritance or permutation. The third set is different from the second set.

An aspect of the present disclosure provides methods for use in embedding a problem into an analog processor. The problem is small in relation to the topology of the analog processor. The method includes finding a set of non-overlapping regions for embedding the problem on the analog processor, applying to the problem spin reversal transformations to generate replicas of the problem. The spin reversal transformations may be applied via a digital processor. The method includes adding the replicas of the problem to a problem Hamiltonian via the digital processor, programming the problem Hamiltonian to the analog processor via the digital processor, and evolving the analog processor.

The method may further include reading out the state of the analog processor, and applying the inverse of the spin reversal transformation to the state of the analog processor via the digital processor.

The digital processor may apply problem automorphisms to generate replicas of the problem.

The method may further include reading out the state of the analog processor, and applying the inverse of the automorphisms to the state of the analog processor via the digital processor.

An aspect of the present disclosure provides methods for assigning coupling strengths to qubits in a linear chain of N qubits. A linear chain of qubits has a first qubit and a last qubit, each qubit is communicatively coupled to one or two other qubits in the linear chain of qubits via a coupler and the first and the last qubit are communicatively coupled to one other qubit in the linear chain of qubits.

The method includes sequentially labelling all couplers in the chain of qubits from i=1 to i=N−1. i=1 is the label assigned to a coupler communicatively coupling the first qubit in the linear chain of qubits and a second qubit in the linear chain of qubits and i=N−1 is the label assigned to a coupler communicatively coupling the last qubit in the linear chain of qubits and a N−1 qubit in the linear chain of qubits. The method iteratively, from i=1 to i=N−1, assigns coupling strength $J_i \propto \sqrt{i}$ to coupler i.

The method may be applied to non-linear chains of qubits. The method assigns to the $i^{th}$ coupler in the non-linear chain a coupling strength $J_i \propto \sqrt{n_l} \cdot \sqrt{n_r}$, where $n_l$ is the number of qubits on a first portion of the non-linear chain of qubit including the $i^{th}$ qubit and $n_r$ is the number of qubits on a second portion of the linear chain of qubits including the $i^{th}+1$ qubit.

An aspect of the present disclosure provides methods for assigning coupling strengths to couplers in an analog processor.

The method includes embedding a problem graph into the hardware graph of the analog processor, determining via a digital processor whether one or more chains in the embedded problem graphs are broken, and, if one of more chains are broken, determining via the digital processor the location of the break and increasing the coupling strengths at the location of the break.

The method may further include causing the analog processor to evolve following a non-uniform annealing schedule across the hardware graph of the analog processor.

Increasing the coupling strength at the location of the break includes finding an upper-bound on the required chain strength by verifying that for each chain C of the embedded problem $-J(e) > b(C, e)$ is respected for each edge e in C, wherein $b(C, e)$ is defined as $b(C, e) := \min\{b(C_1(e)), b(C_2(e))\}$ and $b(C) := \Sigma_{v \in C}|h(v)| + \Sigma_{v \in C}\Sigma_{u \in U_v}|J(v, u)|$ and $J(e)$ is the coupling strength applied to edge e.

The method may further include iteratively repeating until an exit condition is met: sampling from the analog processor via the digital processor, determining via the digital processor whether one or more chains in the embedded problem graphs are broken, and, if one of more chains are broken, determining via the digital processor the location of the break and increasing the coupling strengths at the location of the break.

BRIEF DESCRIPTION OF THE SEVERAL VIEWS OF THE DRAWINGS

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve legibility. Further, the particular shapes of the elements as drawn are not necessarily intended to convey any information regarding the actual shape of the particular elements and have been solely selected for ease of recognition in the figures. Furthermore, while the figures may show specific layouts, one skilled in the art will appreciate that variations in design, layout, and fabrication are possible and the shown layouts are not necessarily to be construed as limiting the geometry of the present systems, devices, and methods.

FIG. 2A is a schematic diagram illustrating an example problem graph.

FIG. 2B is a schematic diagram illustrating an example embedding of the problem graph of FIG. 2A into an example hardware graph.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically erasable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

Figure 1:
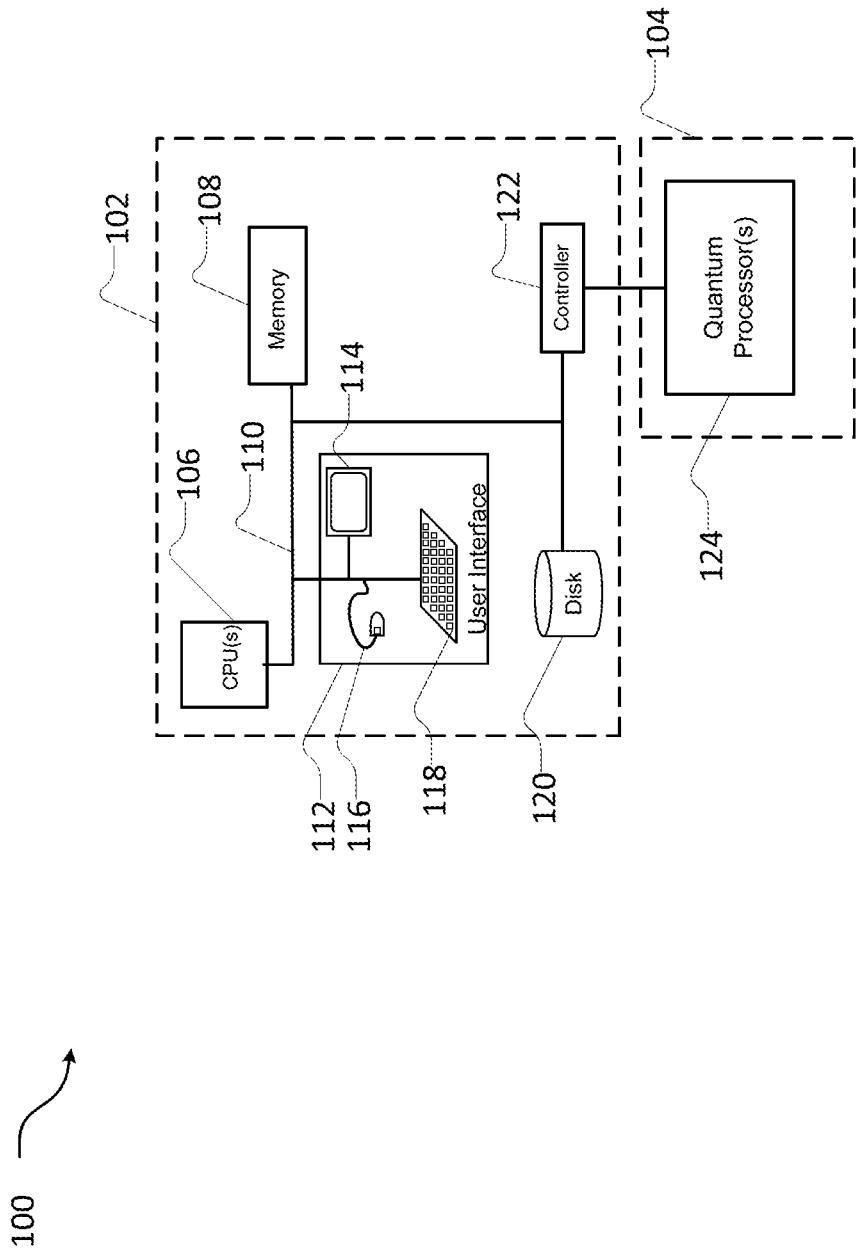
FIG. 1 is a schematic diagram that illustrates a hybrid computing system comprising an analog processor and a digital processor.

FIG. 1 illustrates a hybrid computing system 100 including a digital computer 102 coupled to an analog computer 104. In some implementations the analog computer 104 is a quantum computer. The exemplary digital computer 102 includes a digital processor (CPU) 106 that may be used to perform classical digital processing tasks.

Digital computer 102 may include at least one digital processor (such as central processor unit 106 with one or more cores), at least one system memory 108, and at least one system bus 110 that couples various system components, including system memory 108 to central processor unit 106.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Digital computer 102 may include a user input/output subsystem 112. In some implementations, the user input/output subsystem includes one or more user input/output components such as a display 114, mouse 116, and/or keyboard 118.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 120. Non-volatile memory 120 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 120 may communicate with digital processor via system bus 110 and may include appropriate interfaces or controllers 122 coupled to system bus 110. Non-volatile memory 120 may serve as long-term storage for processor- or computer-readable instructions, data structures, or other data (sometimes called program modules) for digital computer 102.

Although digital computer 102 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104.

In some implementations system memory 108 may store processor- or computer-readable calculation instructions to perform pre-processing, co-processing, and post-processing to analog computer 104. System memory 108 may store at set of analog computer interface instructions to interact with the analog computer 104.

Analog computer 104 may include an analog processor such as quantum processor 124. The analog computer 104 can be provided in an isolated environment, for example, in an isolated environment that shields the internal elements of the quantum computer from heat, magnetic field, and other external noise (not shown).

The various embodiments described herein provide systems and methods for solving computational problems via a quantum processor or a hybrid computing system including a quantum processor. As previously described, a quantum processor may comprise a topology including a number of qubits and a number of coupling devices providing controllable communicative coupling between qubits (e.g., between respective pairs of qubits). The number of qubits and the connectivity (i.e., the number of available couplings each qubit has to other qubits) in a quantum processor's topology are typically fixed, thereby limiting the scope of problems which may be solved by the processor. As a result, there is a need for techniques that facilitate solving problems of different structures via a quantum processor and/or a hybrid computing system comprising a quantum processor. For example, solving a problem that has more variables than the fixed number of qubits in the quantum processor may employ the problem decomposition techniques described in U.S. Pat. Nos. 7,870,087 and 8,032,474.

In at least some quantum processor topologies, the available connectivity may not provide couplings between all variables and, accordingly, some problem formulations may include variable couplings that are not available in the quantum processor topology. The present systems and methods provide techniques for reformulating at least some problems to be solved via less-than-fully-connected quantum processor.

Throughout this specification, the term hardware graph and specific topology are generally used to refer to the specific fixed architecture or topology of a quantum processor (i.e., the fixed number of qubits and connectivity between qubits in the quantum processor topology). A topology may be represented in a graph where a fixed number of qubits corresponds to or is represented by the nodes of the graph and the fixed connectivity corresponds to or is represented by the edges between the nodes. Throughout this specification, the term "Chimera" is generally used to refer to a type of example specific topology of a quantum processor. An example of a Chimera topology is a $C_2$, a 2 by 2 array of $K_{4,4}$ bipartite graph unit cells. In the $C_2$ there are 32 nodes and 80 edges. Another example of a Chimera topology is a $C_8$. This is an 8 by 8 array of $K_{4,4}$ bipartite graph unit cells. In the $C_8$ there are 512 nodes and 1472 edges. In some embodiments, not all nodes and edges in a hardware graph are available. A Chimera topology may be represented in a graph where a fixed number of qubits correspond to or is represented by the nodes of the graph and the fixed connectivity between qubits corresponds to or is represented by edges between the nodes. Examples of quantum processor topologies, including Chimera topologies, are described in greater detail in International Patent Application WO2006066415, U.S. Pat. Nos. 9,170,278 and 9,178, 154.

FIG. 2A is a diagram representing an example problem graph 200a. A problem to be solved via a quantum computer can have one or more decision variables and one or more constraints that apply to the decision variables. The problem may be formulated in terms of a problem graph to be represented in the hardware graph of a quantum processor, where each decision variable is represented by a node (e.g., nodes 201-203) or vertex in the problem graph and each constraint is represented by an edge (e.g., edges 210, 220, 230) between nodes or vertices.

A person skilled in the art will recognize that the terms 'node' and 'vertex' can be used interchangeably in a graph. Therefore, for the purpose of this specification and the appended claims, the term 'node' can be substituted for 'vertex' and 'vertex' can be substituted for 'node'.

Problem graph 200a is an example representation of an example problem having three decision variables, represented by nodes 201, 202, and 203, and three constraints, represented by edges 210, 220, and 230. Although the example problem graph 200a in FIG. 2A has three nodes and three edges, a person skilled in the art will appreciate that a problem graph may have a different number of nodes and/or edges, and/or may have different arrangements of nodes and/or edges. In FIG. 2A, problem graph 200a has an edge 210 between nodes 201 and 202, an edge 220 between nodes 202 and 203, and an edge 230 between nodes 201 and 203.

FIG. 2B is a diagram representing an example embedding of problem graph 200a in an example hardware graph 200b. Hardware graph 200b has four qubits 201', 203', 204, and 205 and four couplers 210', 220', 230', 240 and between pairs of qubits 201', 203', 204, and 205. Qubits are represented as nodes in hardware graph 200b and couplers are represented by edges between nodes. FIG. 2B represents at least a portion of a topology of a quantum processor. Other topologies (e.g., with different connectivity, different numbers of elements, etc.) are also possible.

When solving a problem (e.g., the problem represented by example problem graph 200a of FIG. 2A) with an analog computer, the limitations of the hardware topology may necessitate that embedding techniques be employed to map the problem graph to the hardware graph (e.g., the hardware graph 200b of FIG. 2B). Examples of embedding techniques are described in U.S. Pat. Nos. 7,984,012, 8,244,662 and 9,501,474.

When embedding problem graphs to hardware graphs, a lack of connectivity in the hardware graph may present a challenge in directly mapping each decision variable to a qubit and each constraint to a coupler between qubits. For example, an embedding of problem graph 200a to hardware graph 200b may map nodes 201 and 203 in problem graph 200a to nodes 201' and 203' in hardware graph 200b, respectively, and edges 210, 220 and 230 in problem graph 200a to edges 210', 220' and 230' in hardware graph 200b, respectively. The decision variable represented as node 202 in problem graph 200a may be mapped to qubits 204 and 205; this example embedding is shown in FIG. 2B as chain 202'. The mapping shown in FIG. 2B is an example of embedding technique where one node in the problem graph is mapped to a plurality of qubits in the hardware graph. A different mapping of problem graph 200a to hardware graph 200b may be possible without affecting the correctness of the embedding. Likewise, a different problem graph may be mapped to a hardware graph in multiple ways.

Generally, an embedding contains one or more set of connected qubits in the hardware graph that forms connected subgraphs of the hardware graph. Each set of such qubits is called a chain. As used herein, the term "chain" refers to connected subgraphs with any (connected) topology of qubits and couplers, and not to any particular subgraph topology. For example, a fully-connected subgraph with n qubits may be referred to as a chain for any integer n. As another example, the embedding of FIG. 2B comprises chain 202' containing qubits 204 and 205. In some implementations, a strong ferromagnetic coupling is assigned between qubits in the same chain so that in a low energy-state all the qubits in the chain will take the same spin value. In at least some circumstances it is desirable to minimize and/or reduce the strength of such coupling to decrease problems associated with energy scaling, background susceptibility, and/or other issues. However, a coupling strength that is too low might result in a broken chain, i.e., a chain where the spins of the qubits may not unanimously agree. A solution which includes a broken chain may not be readily mappable to a solution of the unembedded problem. Thus, it may be advantageous when embedding a problem into a hardware graph to find low required chain strengths. Throughout this specification and the appended claims the term 'required chain strength' is used to denote the theoretically minimum chain strength where the chains are not broken in a low-energy state. The required chain strength is not necessarily the same as the actual chain strength applied to the couplers, which is a characteristic of the embedded problem. Throughout this specification and the appended claims the term 'embedding' refers to finding a representation of the problem graph in the hardware graph, the term 'embedded problem' refers to a representation of the problem graph in the hardware graph, and the term 'mapping of the problem graph to the hardware graph' refers to a transformation that assigns a specific node of the problem graph to one or more qubits in the hardware graph.

Figure 3:
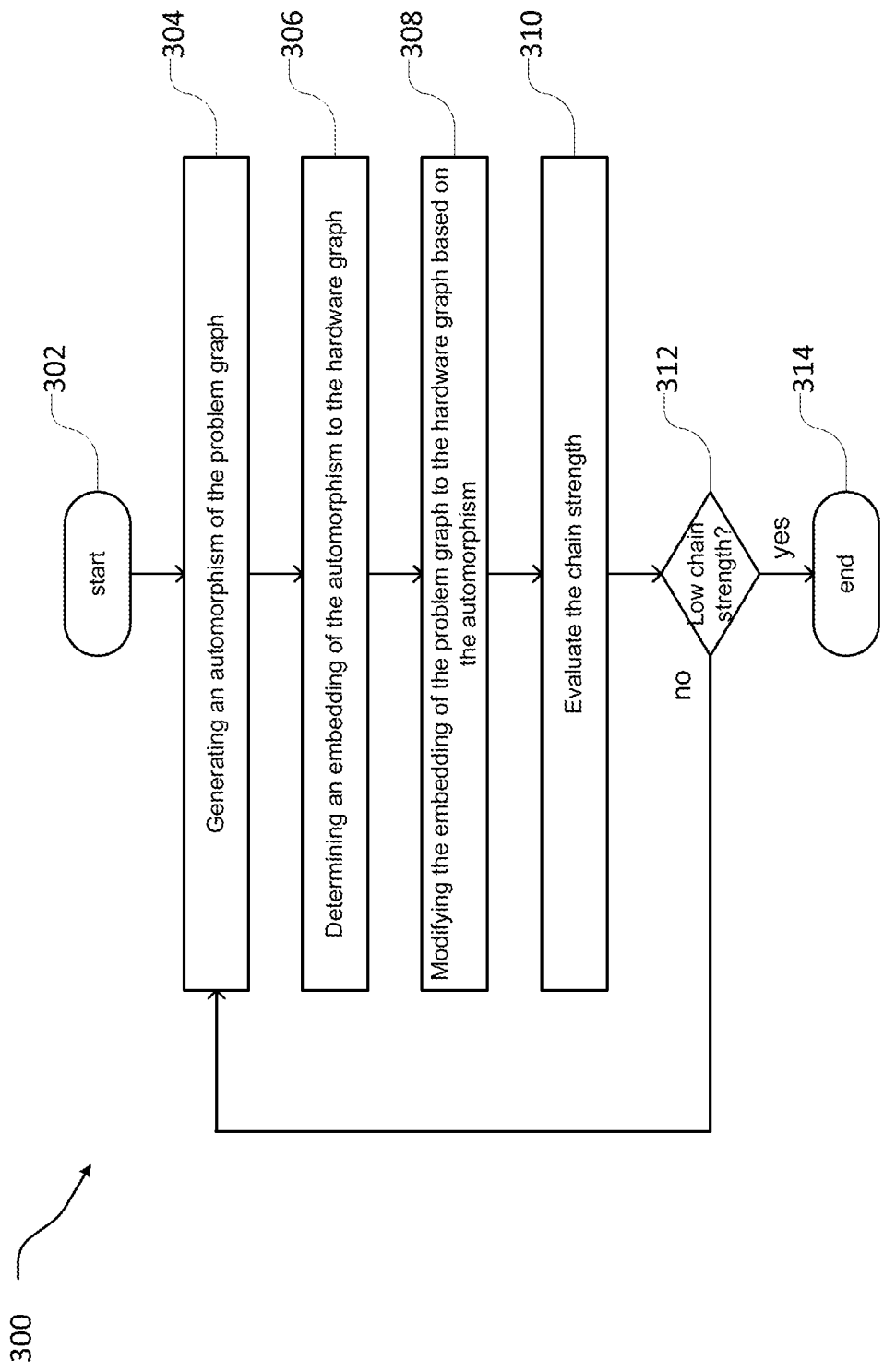
FIG. 3 is a flow diagram showing an example method for embedding a problem graph into a hardware graph via automorphism.

FIG. 3 shows an example method 300 for finding an embedding of a problem graph into a hardware graph via an automorphism of the problem graph such that the embedding has sufficiently low required chain strength. Method 300 comprises acts 302-314. It will be appreciated that the depicted method 300 is exemplary and, in some implementations, certain acts may be omitted, further acts may be added, and/or the order of the acts may be changed.

Method 300 may be used, for example, when one or more of the chain strengths of an embedded problem are high or when more than a threshold number (e.g., one or more) chains are broken. In such circumstances, the mapping of the problem graph to the hardware graph may be modified via method 300 to generate an embedding having lower chain strengths and/or chain strengths which are less susceptible to broken chains. Method 300 may be performed by a hybrid computing system comprising an analog processor and a non-analog processor. The analog processor may be a quantum processor.

Method 300 starts at 302, for example as a response to a call from another routine. The hybrid computing system may receive an embedding of the problem graph to the hardware graph as part of a set of inputs.

At 304, the hybrid computing system produces a first automorphism of the problem graph. An automorphism is a mapping of a graph onto itself such that the mapping preserves the connectivity between the vertices. Therefore, in an automorphism, the set of vertices V of a graph is mapped onto itself such that if, and only if, an edge exists between two vertices v and u of V and (v, u) is mapped to (a, b) in V, then an edge also exists between a and b in V. The number of edges and the number of vertices remains the same when a graph automorphism is generated. A graph may have one or more automorphisms. At 304, one of the possible automorphisms is generated.

At 306, the hybrid computing system determines an embedding of the first automorphism of the problem graph to the hardware graph. In at least one implementation this can be done by composition of the embedding of the problem graph to the hardware graph and the automorphic mapping of the problem graph into itself. In this case, the embedding determined at 306 may be of the form F(g(p)), where p is the problem graph, g is the automorphism of the problem graph and F is the mapping of the problem graph to the hardware graph.

At 308, the hybrid computing system modifies the embedding of the problem graph to the hardware graph, for example the embedding received at 302 as part of set of inputs, such that it corresponds or is equivalent to the embedding of the first automorphism of the problem graph determined at 306. Through this modified embedding, the chain strengths of the embedded problem may be modified, due to the mapping of different nodes of the problem graph to the hardware graph. Since the automorphism will have the same characteristics as the problem graph (e.g., the same number of vertices and the same edges between vertices), the modified embedding represents the same problem.

In some implementations, the hybrid computing system may terminate method 300 after one iteration at 308 and use the embedding produced at 308 to submit the problem to the analog processor; otherwise method 300 proceeds to 310.

At 310, the hybrid computing system evaluates the chain strengths for the chains produced by the mapping generated at 308. At 310, the hybrid computing system may use any suitable method for evaluating chain strengths and/or evaluating whether one or more chains will be broken in a low energy-state. For example, the hybrid computing system may evaluate chain strengths for the embedding obtained at 308 by using a hardware solver. The hardware solver may be, for example, a quantum processor. For example, the quantum processor may derive the required chain strength in the case where h and J (the set of biases applied to qubits and the set of coupling between qubits, respectively) come from a finite set. Evaluating chain strengths may include approximating and/or deriving the chain strength of an embedding.

When evaluating the required chain strengths with a hardware solver, the hybrid computing system may use information from the hardware solver to modify the automorphism to produce an embedding with lower chain strengths. For example, the hardware solver can identify a ground state of the system for which an edge e in a chain C is broken, where chain C represents vertex v of the problem graph G. If, for instance, e is the only edge causing C to be broken and C is a tree, removing edge e leaves two sub-chains $C_1$ and $C_2$, which can be assumed to have unanimous spins ↑ and spins ↓, respectively. Thus, there are likely couplings influencing $C_1$ to have spin ↑ and couplings influencing $C_2$ to have spin ↓. In some circumstances, it may be possible to alleviate the strain on the broken chain in the aforementioned example by constructing an automorphism. The hybrid computing system may choose vertices $v_1$ and $v_2$ of G such that the chain representing $v_1$ is coupled to $C_1$ in the embedded problem and in this state the coupling compels C to take spin ↑ and the chain representing $v_2$ is coupled to $C_2$ in the embedded problem and in this state the coupling compels C to take spin ↓. If an automorphism is applied to G such that $v_1$ and $v_2$ are swapped, then the strain on chain C may be alleviated, which may result in chain C no longer being broken.

At 312 the hybrid computing system evaluates whether to terminate method 300 by testing an exit condition. If the exit condition is met, method 300 proceeds to 314, otherwise to 304 to produce one or more further automorphisms. Each new automorphism investigated may be different from previously produced automorphisms, so the hybrid computing system may produce different embeddings of the problem graph and therefore different chain strengths.

An exit condition may be, for example, determining that an automorphism generated at 304 produces required chain strengths lower than a pre-determined threshold chain strength where no chains are broken.

In some implementations, method 300 exhaustively generates all available automorphisms of the problem graph, therefore iterating a number of times equivalent to the number of automorphisms of a problem graph.

Method 300 terminates at 314, until it is, for example, invoked again.

In some implementations, method 300 enables different potential required chain strengths to be calculated for the chains in the hardware graph. If the newly calculated chains present lower required chain strengths than the original embedding of the problem graph, the hybrid computing system may opt to use the automorphism of the problem graph when embedding the problem.

Figure 4:
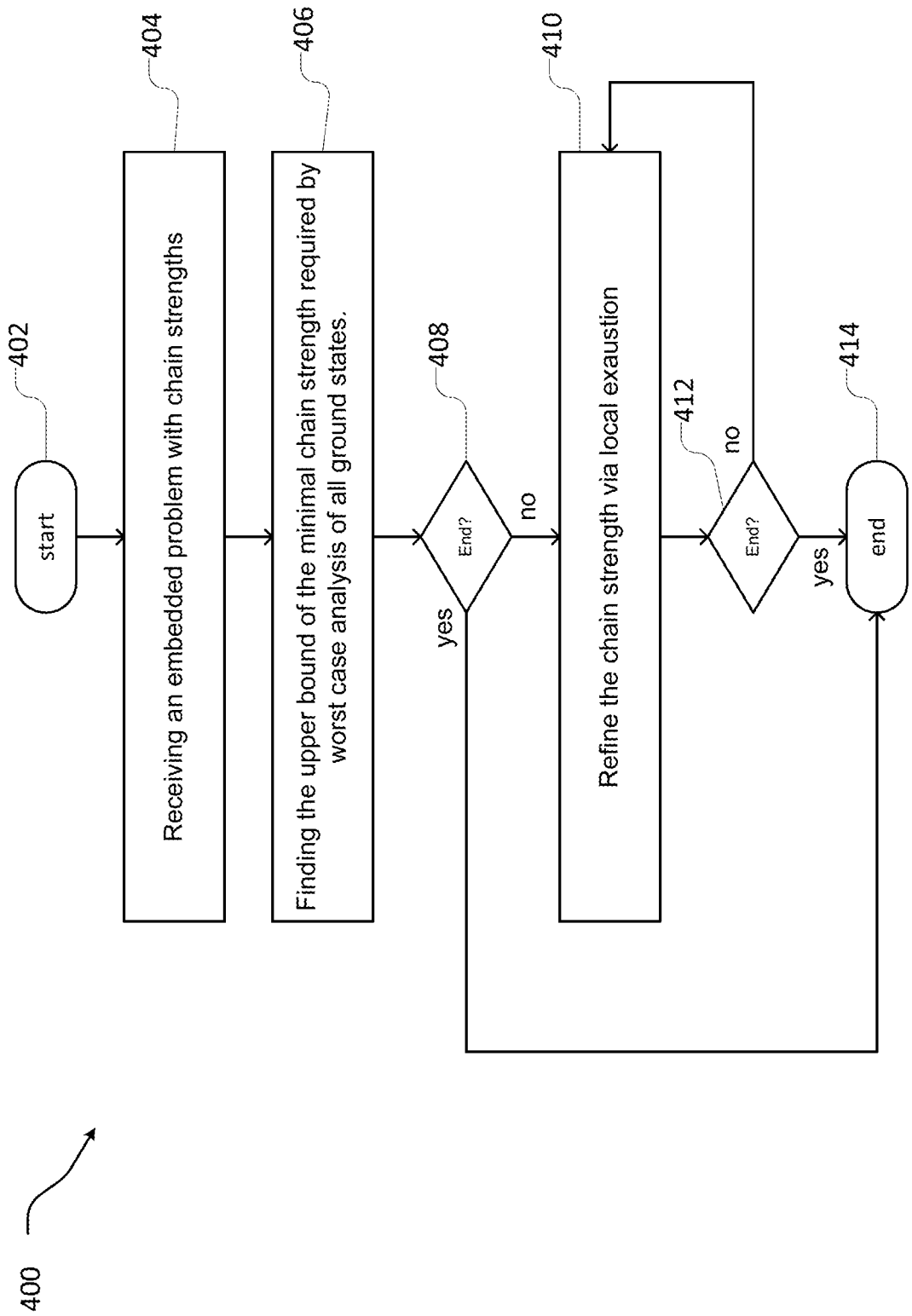
FIG. 4 is a flow diagram showing an example method for determining and refining an upper bound on the required chain strength in an embedding problem.

FIG. 4 shows an example method 400 for evaluating the required chain strengths of the embedded problem by finding an upper-bound on the required chain strength and performing a worst case analysis on all states, assuming that a chain C is a tree. Method 400 may be employed at 310 of method 300 by the hybrid computing system for evaluating required chain strength. Method 400 of FIG. 4 comprises acts 402-414. It will be appreciated that the depicted method 400 is exemplary and, in some implementations, certain acts may be omitted, further acts may be added, and/or the order of the acts may be changed.

Method 400 starts at 402, for example in response to a call from another routine.

At 404, the hybrid computing system receives an embedded problem, having one or more chains. In some implementations, the received embedded problem may correspond to the embedded problem of method 300.

At 406, the hybrid computing system calculates an upper bound on the minimal chain strength required for every ground state of the embedded problem. In some implementations, this is done by verifying that every chain in the embedded problem satisfies $-J(e) > b'(C, e)$, as defined below. This gives an upper bound on the minimal chain strength required to ensure that there are no broken chains in all the possible ground states of the embedded problem.

In some implementations, the upper bound is determined at 406 as follows. For any node $v \in V(C)$, define $U_v$ as the set of non-chain neighbors of v. Let X be a subtree of chain C, i.e., an induced subgraph. It is possible to define the bound b(X) as:

$$b(X) := \sum_{v \in X} |h(v)| + \sum_{v \in X} \sum_{u \in U_v} |J(v, u)|$$

where h(v) is the bias applied to node v and J(u, v) is coupling strength assigned to the edge between v and u.

Given that chain C is a tree, for any edge e in C, removing e leaves exactly two subtrees $C_1(e)$ and $C_2(e)$. If there is a ground state in which exactly one edge e of C is broken, then since flipping all the spins chain cannot decrease the energy, either:

$$-J(e) \leq \sum_{v \in C_1} |h(v)| + \sum_{v \in C_1} \sum_{u \in U_v} |J(v, u)|$$

or $$-J(e) \leq \sum_{v \in C_2} |h(v)| + \sum_{v \in C_2} \sum_{u \in U_v} |J(v, u)|$$

Defining b(C, e) as $$b(C,e) := \min\{b(C_1(e)), b(C_2(e))\}$$

if every edge e of the chain C satisfies $-J(e) > b(C, e)$ then in every ground energy state, C is respected. In the presence of both positive and negative h values, b(X) can be replaced with b'(X), defined as:

$$b'(X) := \max_{X' \text{ is a subtree of } X} \left\{ \left|\sum_{v \in X'} h(v)\right| + \sum_{v \in X'} \sum_{u \in U_v} |J(v, u)| \right\}$$

And b'(C, e) can be defined as:

$$b'(C,e) := \min\{b'(C_1(e)), b'(C_2(e))\}$$

Even in this case, if every edge of chain C satisfies $-J(e) > b'(C, e)$ then in every ground energy state, chain C is respected. The coupling strength assigned to all the edges in C defines an upper bound to the chain strength required for a chain C in every ground state. Therefore, method 400 performs a worst case analysis by finding the upper bound on chain strengths on all possible solutions of the embedded problem.

In some circumstances (e.g., when a chain has a small number of couplings with other chains), chain strengths can be refined by exhaustively testing all possible spin configurations of the neighbors of a chain.

At 408, the hybrid computing system determines whether to exit method 400 by passing control to 414 or to further refine the chain strength by passing control to 410. The hybrid computer may determine whether to exit based on the problem submitted or based on the upper bound determined at 406 satisfying a quality measure.

At 410, the hybrid computing system further refines the upper bound in minimal chain strength by local exhaustion. In some implementations, refinement by local exhaustion is performed as follows. Given a chain C, where C is a tree, with an edge e=vw of C, it is possible to define $J_\epsilon$ as the coupling set constructed by setting the coupling on edge e, J(e), which is assumed to be negative, to $J(e)+\epsilon$, for an $\epsilon > 0$. Accordingly, $h_C$ can be defined as h-bias induced on C, $J_C$ can be defined as the coupling strength J induced on C and $J_{C,\epsilon}$ can be defined as $J_C + \epsilon$, for a $\epsilon > 0$.

Assuming that chain C is respected in every ground state of the embedded problem, by verifying $-J(e) > b'(C, e)$ at act 406, it is possible to define $(h_{C,S,\epsilon}, J_{C,S,\epsilon})$ as a local problem corresponding to a fixed spin configuration S on the neighbors of chain C. If there is an $\epsilon > 0$ such that given any spin configuration S on the neighbors of C, C is respected in every ground state of $(h_{C,S,\epsilon}, J_{C,S,\epsilon})$ then C is respected in every ground state of $(h, J_\epsilon)$.

The hybrid computing system minimizes $\epsilon$ by determining the maximum value for every neighborhood spin configuration and taking the minimum. The hybrid computing system can perform this calculation efficiently on small neighborhoods, as is generally the case for many chains.

Once $\epsilon$ is computed for every edge of a chain C, the hybrid computing system modifies the couplings of C by reducing the strength by $\epsilon(e)$ for each edge e.

At 412, the hybrid computing system determines whether an exit condition has been met. If the exit condition is met, control passes to 414, otherwise to 410, where the hybrid computing system performs another refinement of the chain strength. In at least one implementation, an exit condition is the execution of a predetermined number of iterations of method 400. In other implementations, an exit condition is the iteration of method 400 until no further refinement is found.

Method 400 terminates at 414, until it is for example invoked again.

Figure 5:
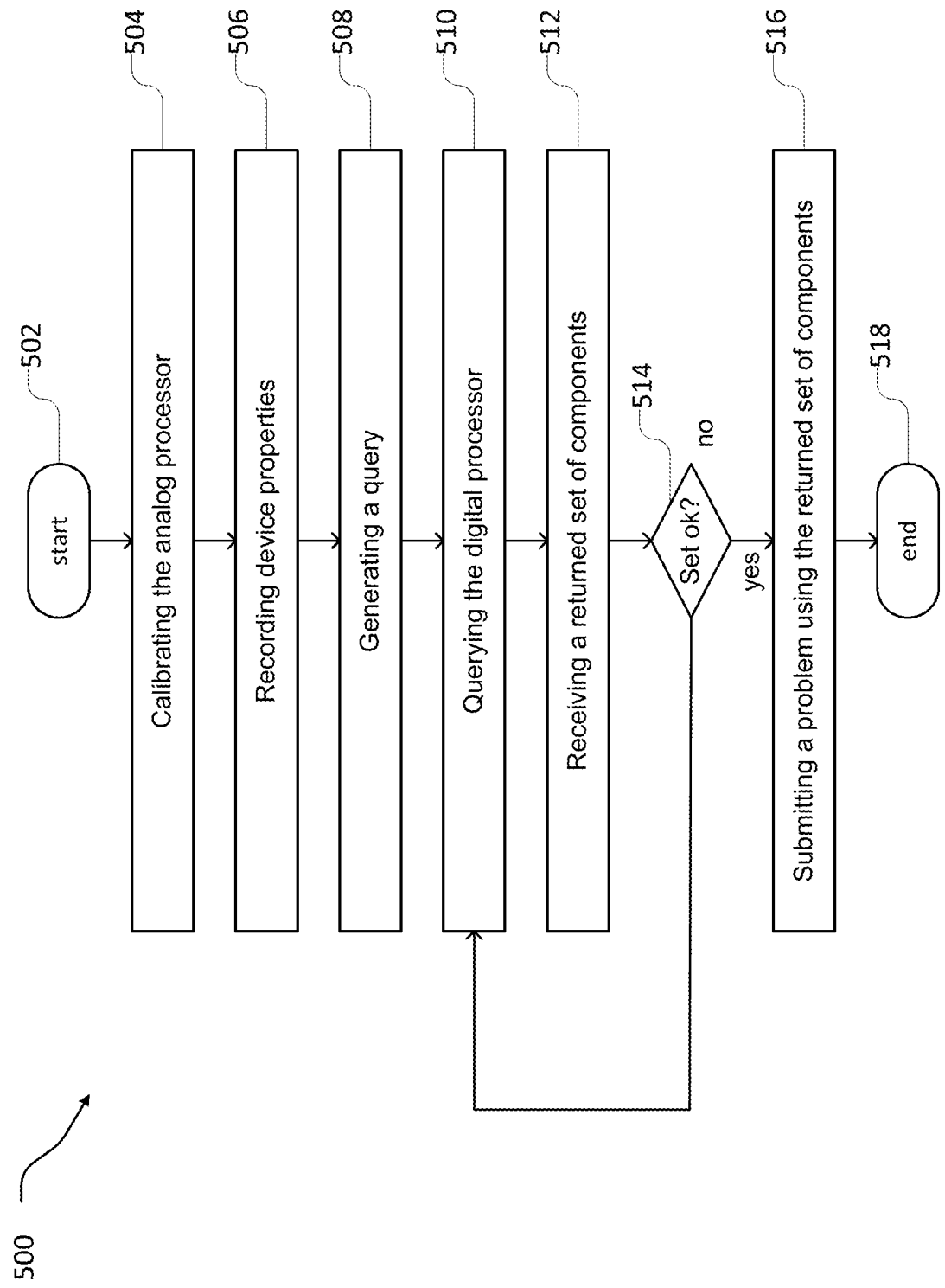
FIG. 5 is a flow diagram showing an example method for selecting components of a quantum processor to submit a problem to a quantum processor.

FIG. 5 shows example method 500 for embedding a problem into an analog processor (e.g., a quantum processor) using properties of qubits and couplers. Method 500 of FIG. 5 selects a set of qubits and coupling devices based on their individual properties, which may vary between devices. The selected set of qubits and coupling devices may be used to embed a problem. An example of properties of qubits and couplers is dead/alive status, h-range, j-range, DAC precision, location on the processor, etc. Although it is possible to submit problems to a quantum processor without regard to the individual properties of the components of the quantum processor, method 500 uses information on such properties to (in at least some circumstances) improve the computation of the embedded problem by the quantum processor.

Method 500 comprises acts 502-518. It will be appreciated that the depicted method 500 is exemplary and, in some implementations, certain acts may be omitted, further acts may be added, and/or the order of the acts may be changed. Method 500 may be implemented by a hybrid computing system comprising an analog processor and a non-analog processor. The analog processor may be a quantum processor.

Method 500 starts at 502, for example in response to a call from another routine.

At 504, the analog processor is calibrated. At 504, the entire processor or a portion of the processor may be calibrated. During calibration components of the analog processor are assessed. Such components may include qubits and couplers and other components necessary to the operation of an analog processor.

At 506, the individual properties of the components comprising the analog processor are recorded, for example via a digital or non-analog processor. FIG. 5 shows acts 504 and 506 as separate and successive, although in some implementations acts 504 and 506 are performed in parallel or concurrently. In this latter case, when one component is assessed, its properties are recorded before assessing another component.

In some implementations, 504 and/or 506 comprise, during calibration of an analog processor, recording some or all properties of individual components of the processor and finding the largest set of components that work within a certain tolerance.

Components comprising an analog processor have many properties that can be measured and recorded. An example of properties of qubits and couplers is dead/alive status, h-range, j-range, DAC precision, location on the processor, etc.

Several means may be employed to record the properties of the individual components of an analog processor, for example a digital processor or a database may be used.

At 508, the hybrid computing system generates a query based on the value of the individual components of the analog processor. The query may specify a value or a range of values for one or more individual components of the analog processor. For certain classes of problems it may be advantageous to use components with a specific property, for example h-range, while for other classes of problems, components with a specific j-range may be preferred. Thus, it may be advantageous to generate a query for a specific range of values, instead of being restricted to a pre-selected range for all components of the analog processor. For certain classes of problems it may be advantageous to select multiple properties, therefore generating a query for multiple properties of the individual components.

At 510, the hybrid computing system queries the digital processor or database used to record device properties at 504 and/or 506 by submitting the query generated at 508.

At 512, the digital processor or database may return a set of components (e.g., qubits and couplers) that satisfy the query.

At 514, the hybrid computing system determines if the set of components returned at 512 satisfies a quality measure. It may be advantageous for certain classes of problems to use the full range of properties of each individual component of the analog processor. Alternatively, or in addition, a larger area of the processor may be available for use than the area that would be available when considering a narrow range of properties or multiple problems can be submitted to the processor to be processed simultaneously using different areas of the processor.

If the set of components meets the quality requirements, control passes to 516, otherwise to 510 where the digital processor or database is queried again. In some implementations, the digital processor or database is queried a predetermined number of times before a set of components that best meet the quality requirements is returned and control passes to 516.

At 516, the hybrid computing system submits a problem to the analog processor using the set of components returned at 512. In some implementations, method 500 may result in using a portion of the analog processor regardless of the actual capabilities of each individual component of the processor.

At 518, method 500 terminates, until it is for example invoked again.

In addition to selecting reduced chain strengths for embedding and selecting the desired components for submitting a problem, an additional layer of discretion may be desired when submitting a problem to an analog or a quantum computer. This is a feature that might be particularly desirable when providers of analog or quantum computing services offer access to analog or quantum processors through online systems. Many security layers are commonly used to prevent leakage of information that can occur when information travels through a network. However, an additional layer of protection can be added by obfuscating the data sent to the analog or quantum computer.

Figure 6:
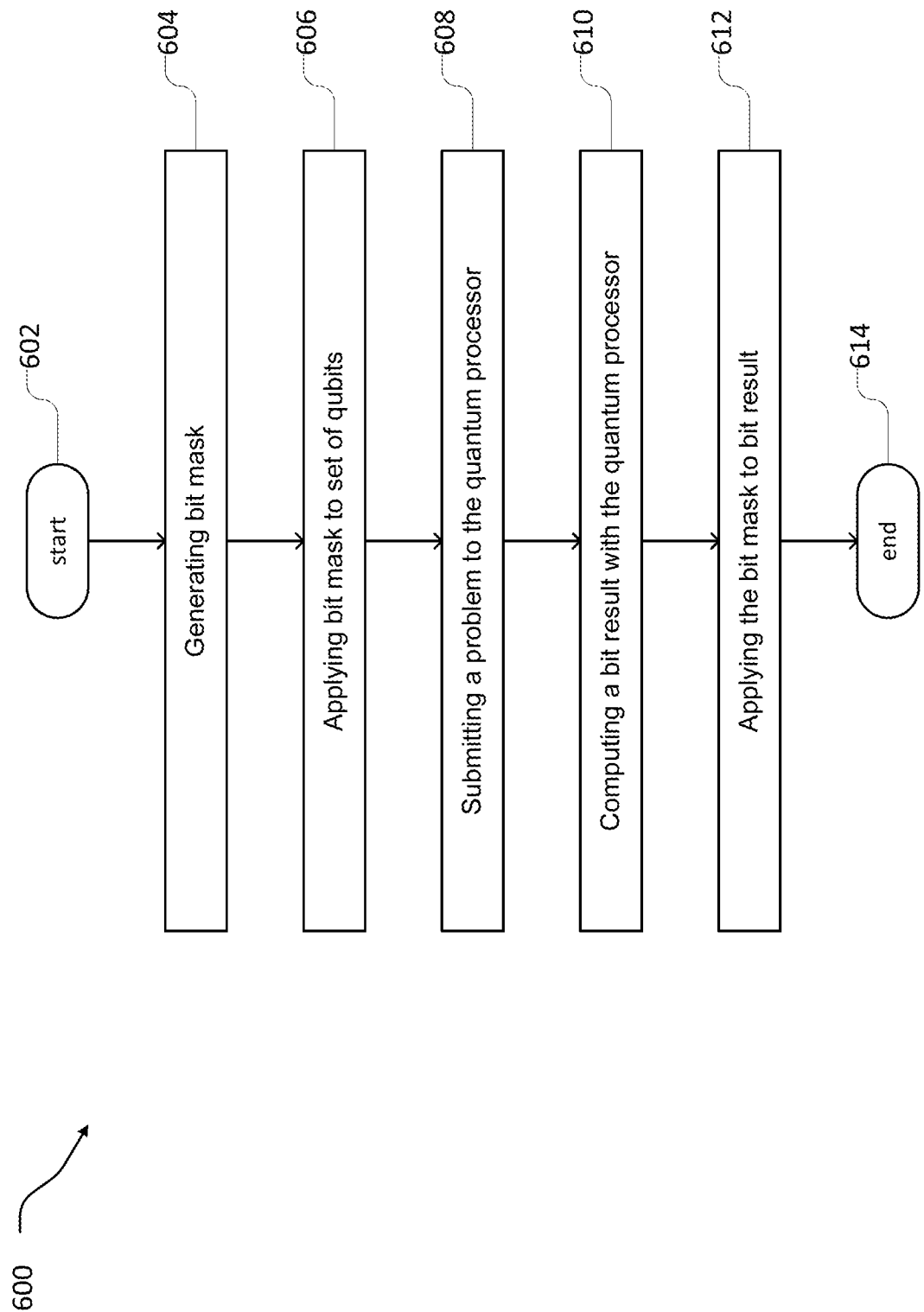
FIG. 6 is a flow diagram showing an example method for submitting a problem to a quantum processor via a bit mask.

FIG. 6 shows example method 600 for use in submitting a problem to an analog processor and adding a layer of obfuscation to the problem. The analog processor can be a quantum processor.

Method 600 of FIG. 6 comprises acts 602-614. It will be appreciated that the depicted method 600 is exemplary and, in some implementations, certain acts may be omitted, further acts may be added, and/or the order of the acts may be changed.

Method 600 starts at 602, for example in response to a call from another routine.

At 604, a bit mask of length corresponding or equivalent to the number of decision variables of the problem to submit to the analog processor is generated. The mask may be generated by a digital processor. In some implementations this bit mask can be randomly or pseudo-randomly generated and/or cryptographically strong. Any suitable method can be applied to produce the bit mask.

At 606, the bit mask generated at 604 is applied to the analog processor. Where the analog processor is a quantum processor, the bit mask is applied to the qubits used to submit the problem to the quantum processor. Depending on the value of the $i^{th}$ bit of the bit mask, the sign of the value of the h-bias applied to the $i^{th}$ qubit is inverted. As an example, in one implementation of method 600 if the valued of the $i^{th}$ bit is 1, the sign of the h (or bias value) of the $i^{th}$ qubit in the problem is changed. In an alternate implementation, the sign of the h-value of the $i^{th}$ qubit may be changed if the value of the $i^{th}$ bit in the bit mask is 0. In addition, if the value of the h-bias applied to the $i^{th}$ qubit is changed and the $i^{th}$ qubit is coupled to a $j^{th}$ qubit with coupling strength $J_{ij} \neq 0$ and the sign of the h-bias applied to $j^{th}$ qubits is not changed, then the sign of the coupling $J_{ij}$ is also changed. In the case where both the $i^{th}$ and the $j^{th}$ qubit h-bias change sign, according the bit mask, then the sign of the coupling strength $J_{ij}$ does not need to be changed. The same applies to all the qubits that are connected to the $i^{th}$ qubit.

At 608, the problem is submitted to the analog processor. The submission can occur through one or more potentially unsecure or untrusted networks. Alternatively, or in addition, method 600 may be used when submitting a problem over one or more secure networks. The problem submitted at 608 is the problem derived from the bit mask applied to the qubits at 606.

At 610, the analog processor provides a solution to the problem submitted at 608. This solution is returned through one or more networks. The networks used to return the solution might be the same used to submit the problem to the analog processor at act 608, and/or different networks can be used.

At 612, the bit mask generated at 604 is applied to the solution provided by the analog processor at 610. It is to be noted that the solution provided by an analog processor can be in the form of an Ising Spin (either 1 or −1) for each qubit and is, therefore, a bit string. By applying the bit mask the solution to the original problem is recovered.

Method 600 terminates at 614, until it is for example invoked again.

Method 600 can, in certain implementations, reuse the same bit mask generated at 604 for subsequent problems submitted or at each submission a different bit mask can be generated. Method 600 can be applied to other type of problems that have bit strings as solutions and have bit symmetry, so that applying the same mask will provide the solution to the original problem.

The present systems, methods and apparatus comprise techniques for submitting problems to analog processors (e.g., quantum processors) with optimal parameter settings. When solving problems with analog processors it may be difficult to determine optimal parameter settings. Examples of some of the parameters that are present in a quantum processor are chain strength and spin reversal transformation.

Appropriate settings for some or all of the parameters in question may need to be estimated, depending on the class of problems to be submitted to the processor. However, it is difficult to estimate optimal parameter settings without completely or partially solving the problem. For example, randomly or pseudo-randomly generating parameter settings may produce good parameter settings in some circumstances, but such an approach is unlikely to produce optimal settings for very hard problems.

In some implementations, parameter settings can be generated based on Genetic Algorithms, or GA. Genetic Algorithms are search heuristics that mimic natural selection. This type of algorithms can be used for optimization problems. An example of the techniques that may be used by genetic algorithms to solve optimization problems are inheritance and mutation. Examples of uses of genetic algorithms to evolve parameters are described in Chittineni et al. (https://arxiv.org/ftp/arxiv/papers/1312/1312.5814.pdf).

A new set of parameters for an analog processor may be generated using mutation or inheritance or other techniques from an original set of parameters. Parameters, for example spin reversal transformations, can be evolved in one or more ways. For example, the spin reversal for each qubit can be selected randomly from a parent, the spin reversal for a group of qubits can be selected from a parent that presents an optimal value in a group, and/or the spin reversal may be otherwise selected. Some parameters, such as chain strengths, can be evolved by mutation via perturbation or recombined according to mean values. A plurality of approaches can be employed for a genetic evolution of parameters and the present specification and appended claims are not limited to a particular genetic evolution.

The present techniques for determining optimal parameter settings may be used with or as part of other methods for operating analog processors, for example quantum processor. Some of these methods may include modifying annealing schedules, as described in International Patent Application No US2016/059169.

Figure 7:
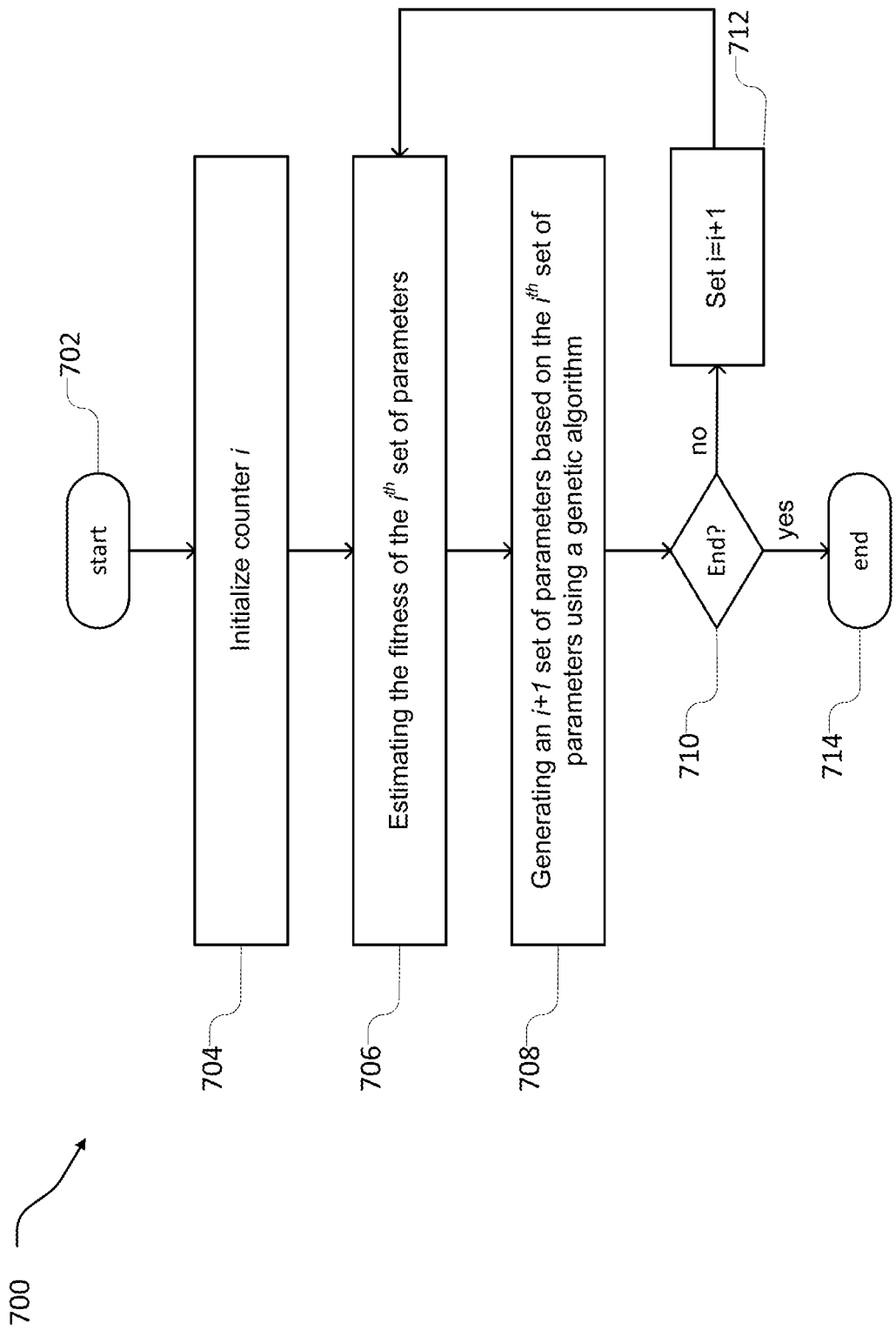
FIG. 7 is a flow diagram showing an example method for selecting parameters in an analog processor using a genetic algorithm.

FIG. 7 illustrates example method 700 for parameter selection in an analog processor using a genetic algorithm. Method 700 of FIG. 7 can be applied to any form of analog processors, in particular it can be applied to quantum processors.

Method 700 comprises acts 702-714 and may be implemented via a hybrid computing system comprising an analog processor and a digital or non-analog processor. It will be appreciated that the depicted method 700 is exemplary and, in some implementations, certain acts may be omitted, further acts may be added, and/or the order of the acts may be changed.

Method 700 starts at 702, for example in response to a call from another routine.

At 704, the hybrid computing system initiates a counter i to an initial value (e.g., i=0).

At 706, the fitness of a current set of parameters (i.e., the $i^{th}$ set of parameters) is evaluated by the digital processor. Some of the parameters to be evaluated may be spin reversal transformations and/or chain strength. An example of a method to predict optimal spin reversal transformation and chain strength is described in Perdomo-Ortiz et al. (See http://arxiv.or/abs/1503.01083). It will be understood that the fitness evaluation of act 706 can be done by any suitable method and this specification and appended claims are not restricted to a particular method.

At 708, the hybrid computing system generates a new set of parameters (e.g., an i+1 set of parameters) using a genetic algorithm applied to the original set of parameters (e.g., the $i^{th}$ set of parameters). For example, the new set of parameters can be evolved from the original set via permutation or recombination or randomly chosen according to fitness. Some of the techniques of genetic algorithms discussed above could be used. In particular, the fitness evaluation of act 706 can be employed to evolve the parameters. The new set of parameters may be employed to submit a problem to the analog processor.

At 710, the digital processor tests an exit condition. If the exit condition has been met, control passes to 714, otherwise to 712. An exit condition may be the execution of method 700 for a predetermined number of iterations. Alternatively, method 700 may keep iterating until a satisfactory level of parameter refinement has been reached. Method 700 iteratively keeps testing the fitness of the newly generated parameters and evolving them with a genetic algorithm, therefore repeating act 706 and 708 until no further refinement of the parameter's fitness can be found. At the $i^{th}$ generation, the fitness of parameter set i is evaluated and used as a basis to evolve the $(i+1)^{th}$ set of parameters. The newly obtained set of parameters can then be employed to run a problem on the analog processor.

At the 712 the counter is incremented and set to i=i+1. Control then passes back to 706 where the fitness of the latest set of parameters is evaluated.

At 714 method 700 terminates, until it is for example invoked again.

The present systems, methods and apparatus comprise techniques for submitting problems to an analog processor by using a space-efficient mapping. When considering embedding a problem graph into a hardware graph, the fixed topology of the hardware graph may present a challenge in directly mapping the variables of the problem graph to the hardware graph. It may be desirable to use an embedding technique that finds a space-efficient mapping of the problem graph to the hardware graph in a reasonable time. A space-efficient mapping is desirable to be able to embed large problems, consuming the available number of qubits in the processor, and/or, in some occurrences, to be able to embed more than one problem at the same time in a processor, and/or attempting to limit the length of chains of logical qubits.

Figure 8:
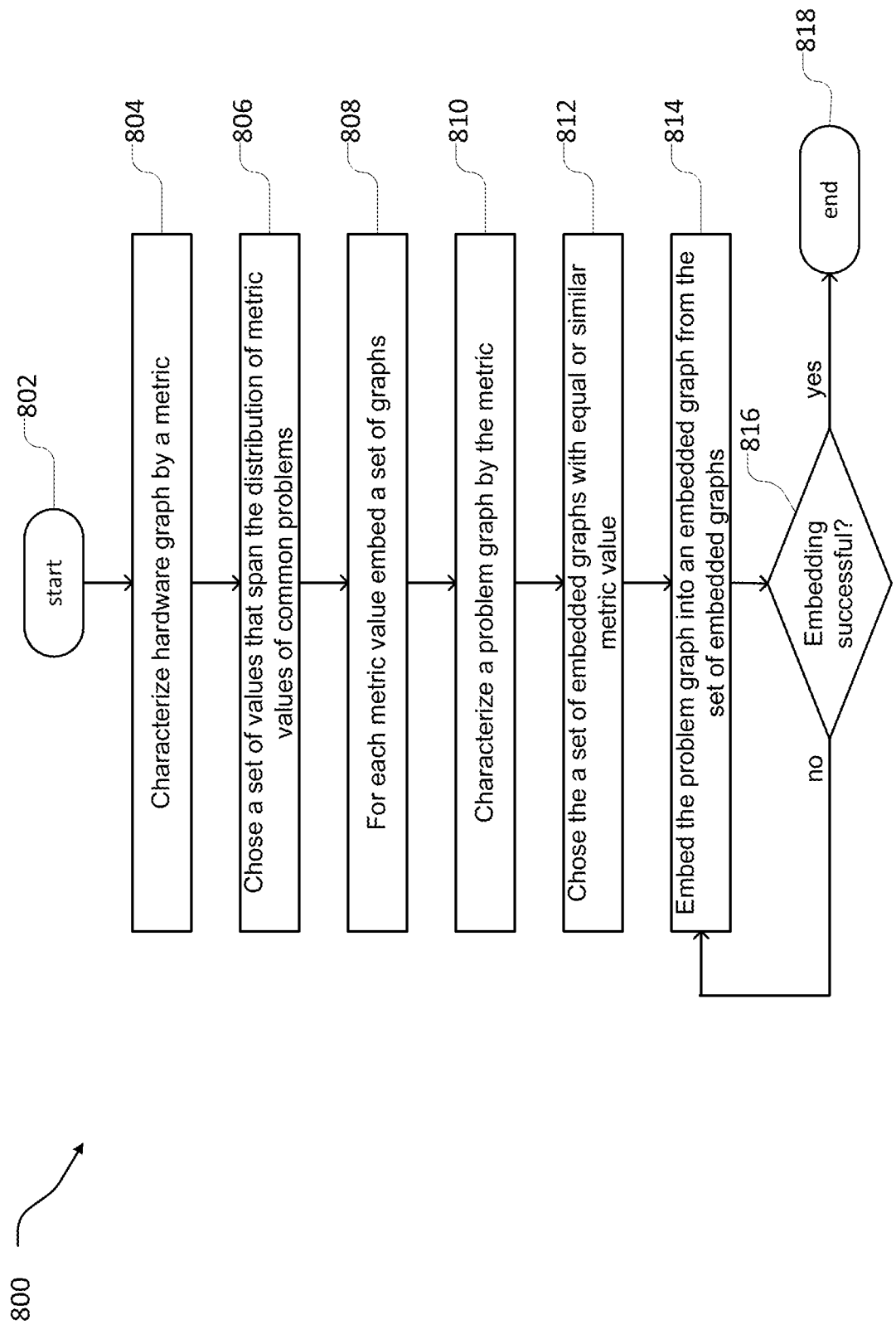
FIG. 8 is a flow diagram showing an example method for determining a set of embedded graphs in an analog processor to use when embedding a problem graph.

FIG. 8 illustrates example method 800 for embedding a problem graph into a hardware graph. The hardware graph may constitute the topology of a quantum processor. Method 800 may be applied to a graph with a Chimera topology, but may also be applied other topologies.

Method 800 comprises acts 802-818. It will be appreciated that the depicted method 800 is exemplary and, in some implementations, certain acts may be omitted, further acts may be added, and/or the order of the acts may be changed. Method 800 may be implemented via a hybrid computing system comprising an analog processor and a digital or non-analog processor. The analog processor may be a quantum processor.

Method 800 starts at 802, for example in response to a call from another routine.

At 804, the hybrid computing system characterizes a hardware graph using a metric. Various metrics can be used at 804 to characterize the hardware graph according to properties important to embedding problems. As an example, the connectivity of the hardware graph can be described by way of the distance of the edges and can be used a metric.

At 806, the hybrid computing system chooses a set of metric values to represent a distribution of metric values derived from a set of problems. Each problem in the set is characterized according to the same metric. The set of problems may comprise, for example, problems which are commonly encountered in a particular context. An example of problems that can be considered are k-SAT problems.

At 808, the hybrid computing system generates a set of embedded graphs for each metric value in the set of metric values chosen at 806. Each set of embedded graphs corresponds to or matches the embedding of a problem graph characterized by the metric value. This set of embedded graphs may be stored for later use in the digital processor or a database. The set of embedded graphs may be stored in the digital processor or in a database.

Acts 804 through 808 may be repeated infrequently, as an example, when the analog processor is installed or calibrated.

At 810, a problem graph to be submitted to the hybrid computing system is characterized according to the same metric used at 804 to characterize the hardware graph. The problem graph considered at 810 may be described by a metric value, according to the chosen metric.

At 812, the hybrid computing system considers all the set of embedded graphs obtained at 808 and selects the set of embedded graphs with an equal or similar metric value. As an example, if the metric employed at 804 and 810 describes the connectivity of the hardware graph and the problem graph, respectively, at act 812 the hybrid computing system may select a set of embedded graphs at least as densely connected as the problem graph. At 812 the hybrid computing system may, for example, query the digital processor or database.

At 814, the hybrid computing system performs an embedding of the problem graph into a first embedded graph from the set of embedded graphs obtained at 812. This embedding may be more efficient and faster than embedding the problem graph into the hardware graph.

At 816 the hybrid computing system determines whether the embedding from act 814 is successful. A successful embedding may be one where all the variable and constraints of the problem graphs are correctly represented into the hardware graph. In at least one implementation a successful embedding may be one with optimal chain strength, as discussed above with reference to method 300 and/or method 400. If the hybrid computing system determines that the embedding from act 814 is successful, control passes to 818, otherwise to 814, where the hybrid computing systems performs an embedding of the problem graph into another one of the embedded graphs from the set of embedded graphs.

As an exemplary use, acts 804 through 808 may only need to be performed infrequently, or only when the analog processor is installed or calibrated and acts 810-816 may be repeated for most or all the problems to be submitted to the analog processor without repeating acts 804-808 at each iteration.

Method 800 terminated at 818, until it is for example invoked again.

When using an analog processor, such as a quantum processor to solve problems or sample from distributions, sources of errors may be introduced. Some sources of errors may be related to the analog processor, such as Intrinsic Control Errors (ICE) or asymmetry of the embedding. When a problem graph is embedded into the hardware graph of an analog processor, chains may need to interact in different locations of the hardware graph of the processor. Furthermore, chains interacting in their middle may behave differently from chains interacting at their endpoints.

To mitigate, or attempt to mitigate, this effect, the problem graph may be submitted multiple times to the analog processor via different spin reversal transformation and/or multiple automorphisms. However, even though errors may be reduced by re-submitting the problem, thus receiving multiple read-outs of the problem's solution, increased time is required to reprogram and submit the same problem multiple times to the analog processor. In addition, resubmission of the same problem (even through multiple automorphisms) on the same location of the hardware graph of an analog processor may not reduce location-dependent errors, such as per-qubit ICE.

For small problems, i.e., where the problem graph can be embedded as a subgraph of the hardware graph and more than one instance of the subgraph can be embedded on the hardware graph at the same time in different and non-overlapping regions of the hardware graph, replicas of the small problem can be submitted to the hardware graph with different spin reversal transformations and/or different automorphisms to attempt to reduce both location-dependent and other types or errors.

Figure 9:
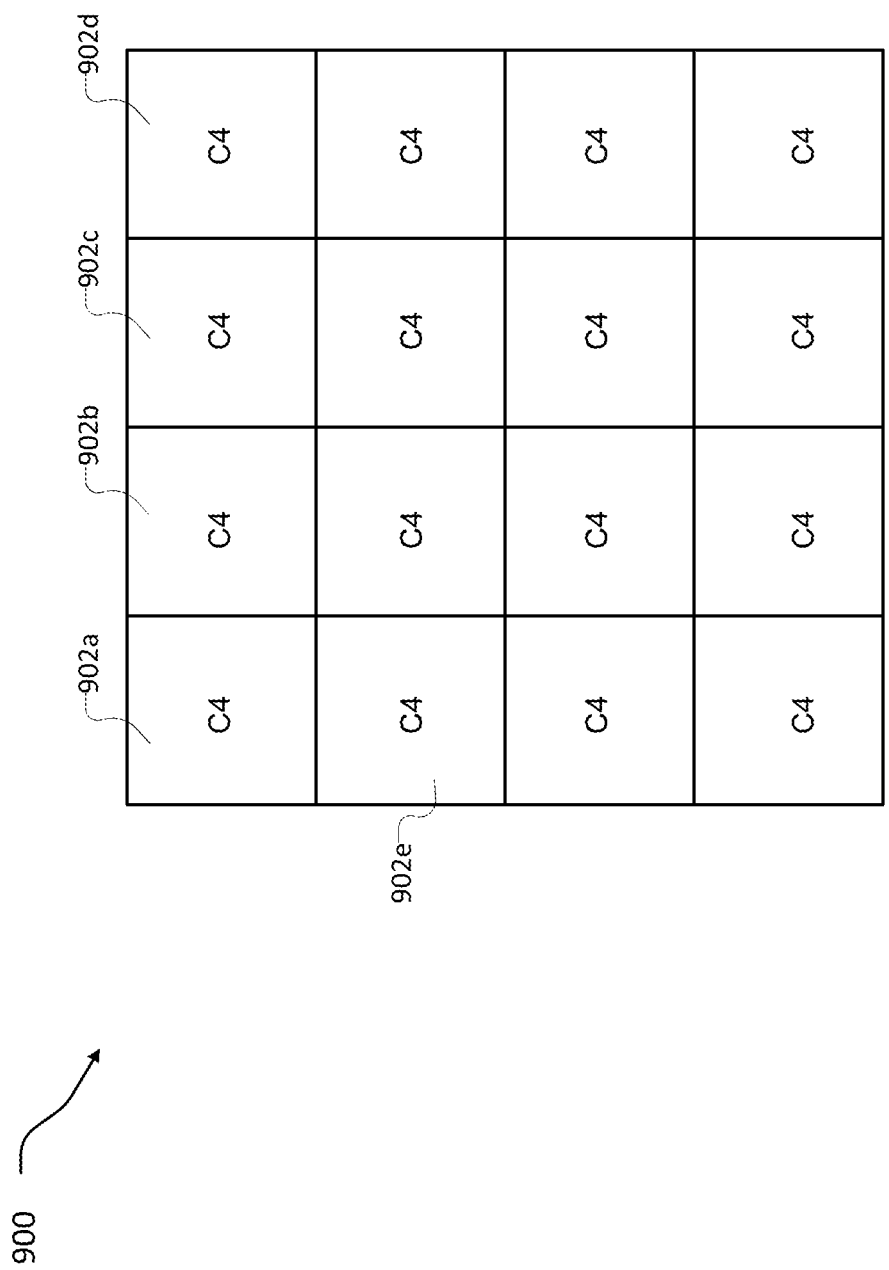
FIG. 9 is a schematic diagram of an exemplary analog processor comprising a C16 Chimera graph.

As an example, in a complete $C_{16}$ Chimera graph it is possible to fit 16 non-overlapping $C_4$ graphs. FIG. 9 is a schematic diagram of an exemplary analog processor 900 with a topology represented as a $C_{16}$ Chimera graph. Analog processor 900 may be sub-divided into 16 non-overlapping $C_4$ sub-graphs, such as graphs 902a, 902b, 902c, 902d, 902e (only five called out in FIG. 9 to reduce clutter, collectively 902). Where a problem graph may be representable as a $C_4$ sub-graph, it is possible to fit 16 non-overlapping replicas of the problem graph into processor 900, where each replica is represented in FIG. 9 as one of the 902 sub-graphs.

While processor 900 is sub-divided into 16 $C_4$ sub-graphs, a person skilled in the art will understand that the size and number of the sub-graphs 902 is for illustration purposes only and it is possible to sub-divide processor 900 with non-overlapping sub-graphs of different sizes. For example, processor 900 may be sub-divided into four $C_8$ sub-graphs (not shown in FIG. 9). Alternatively, or in addition, fewer than 16 non-overlapping $C_4$ subgraphs may be fitted at one time on the hardware graph.

Figure 10:
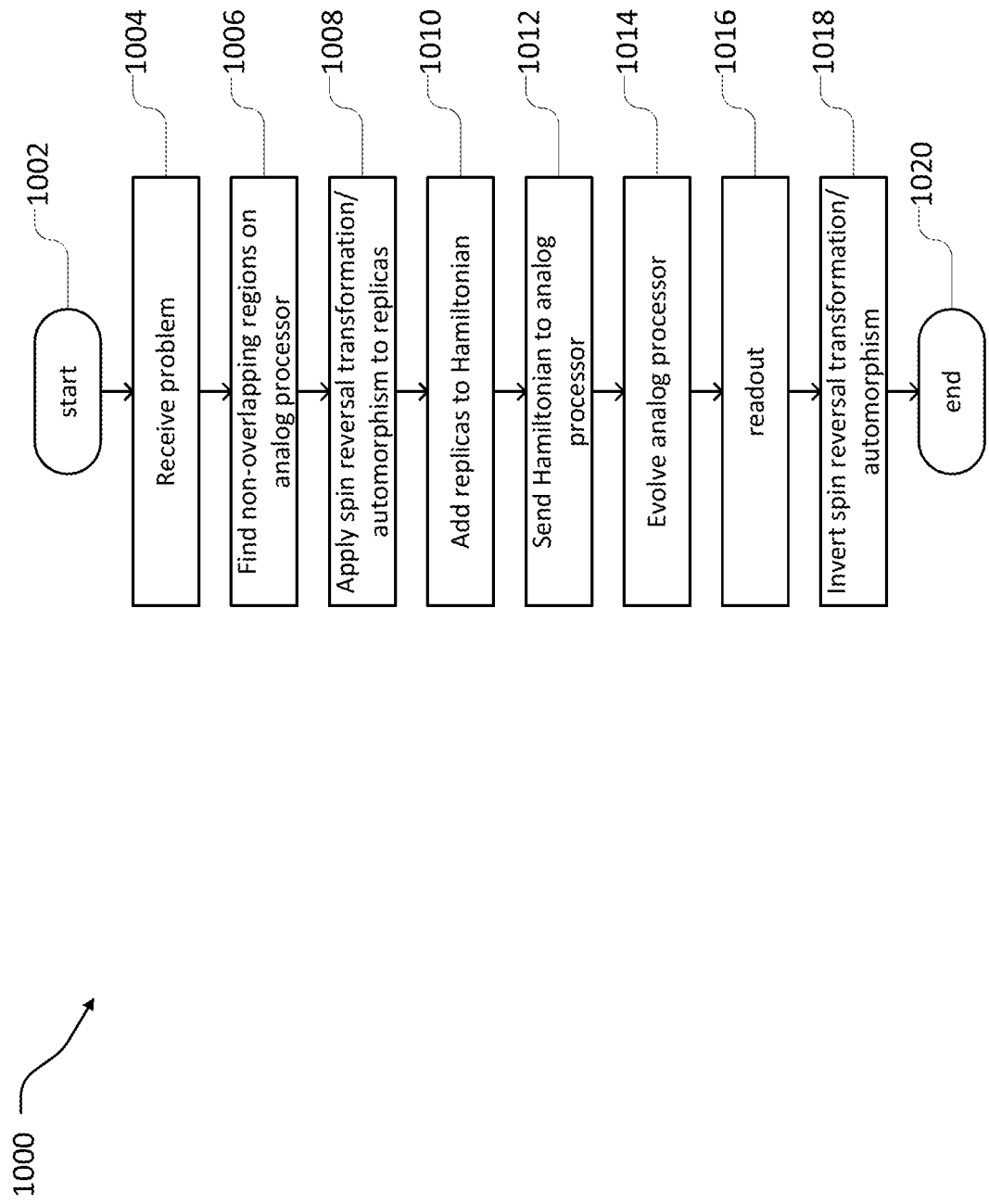
FIG. 10 is a flow chart of an example method for embedding a problem graph into the hardware graph of an analog processor, where the problem graph is mapped to multiple non-overlapping sub-graphs of the hardware graph.

FIG. 10 is a flow chart of an exemplary method 1000 for embedding a problem graph into the hardware graph of an analog processor, where the problem graph is mapped to multiple non-overlapping sub-graphs of the hardware graph. The hardware graph may constitute the topology of a quantum processor. Method 1000 may be applied to a graph with a Chimera topology, but may also be applied other topologies. Method 1000 will be described with reference to processor 900 of FIG. 9.

Method 1000 comprises acts 1002-1020. It will be appreciated that the depicted method 1000 is exemplary and, in some implementations, certain acts may be omitted, further acts may be added, and/or the order of the acts may be changed. Method 1000 may be implemented via a hybrid computing system comprising an analog processor and a digital processor. The analog processor may be a quantum processor.

Method 1000 starts at 1002, for example in response to a call from another routine.

At 1004, the hybrid computing system receives a problem to be submitted to the analog processor. The problem received may be a small problem in relation to the size of the analog processor, as defined above, or be a portion of a problem that is small in relation to the size of the analog processor. The received problem may be, for example, representable as a $C_4$ graph, as shown in FIG. 9. The problem received may be already mapped as an embedded problem for the analog processor.

At 1006, the hybrid processor determines a set of non-overlapping regions on the hardware graph of the analog processor to embed replicas of the embedded problem. The set may contain as many replicas as possible. As an example, the hybrid processor may determine the set non-overlapping locations by heuristic approaches to the Independent Set problem.

At 1008, the hybrid computing system applies spin reversal and/or automorphisms to the replicas of the problem received. In at least one implementation, different spin reversal transformations and/or automorphisms are applied to all replicas of the problem received at 1002.

At 1010, the hybrid computing system adds all the replicas of the problem to a Hamiltonian function to be programmed into the analog processor.

At 1012, the hybrid computing system programs the Hamiltonian from 1010 into the analog processor.

At 1014, the hybrid computing system causes the analog processor to evolve until it is in a low energy state.

At 1016, the hybrid computing system reads out the state of the analog processor.

At 1018, the hybrid computing system applies the inverse of the spin reversal transformations and/or automorphisms to the readout from 1016 to reconstruct solutions to the original problem. The hybrid computing system will reconstruct as many solutions as the number of replicas of the problem that were programmed into the analog processor.

Method 1000 terminates at 1020, until it is, for example, invoked again.

When embedding a problem graph into a hardware graph of an analog processor, it may be necessary to link together physical qubits into chains of qubits, or logical qubits. An example of a problem graph may be a bipartite graph. To ensure that during the evolution of the analog processor the embedded problem corresponds, or is equivalent, to the problem graph, in general the energy scale of the coupling strengths between qubits in a chain must exceed the coupling strengths of the rest of the embedded problem.

A possible way of constructing chains in the embedded problem is to choose an overall coupling strength $\alpha$ which represents the ratio between the coupling strengths in the chain and the largest coupling strength in the rest of the embedded problem, and assign this coupling strength $\alpha$ to all the coupling in the chain of qubits. Given that $\alpha$ is larger than other coupling strengths in the embedded problem, chains may not break in a low energy state of the system.

However, in addition, or alternatively to some of the effects of strong coupling strengths discussed with reference to FIGS. 2A and 2B, it may be also desirable to reduce coupling strengths to avoid chains of qubits to localize, or freeze-out, earlier in the evolution cycle of the analog processor compared to chains with weaker couplings, and/or to boost effective temperature.

Figure 11:
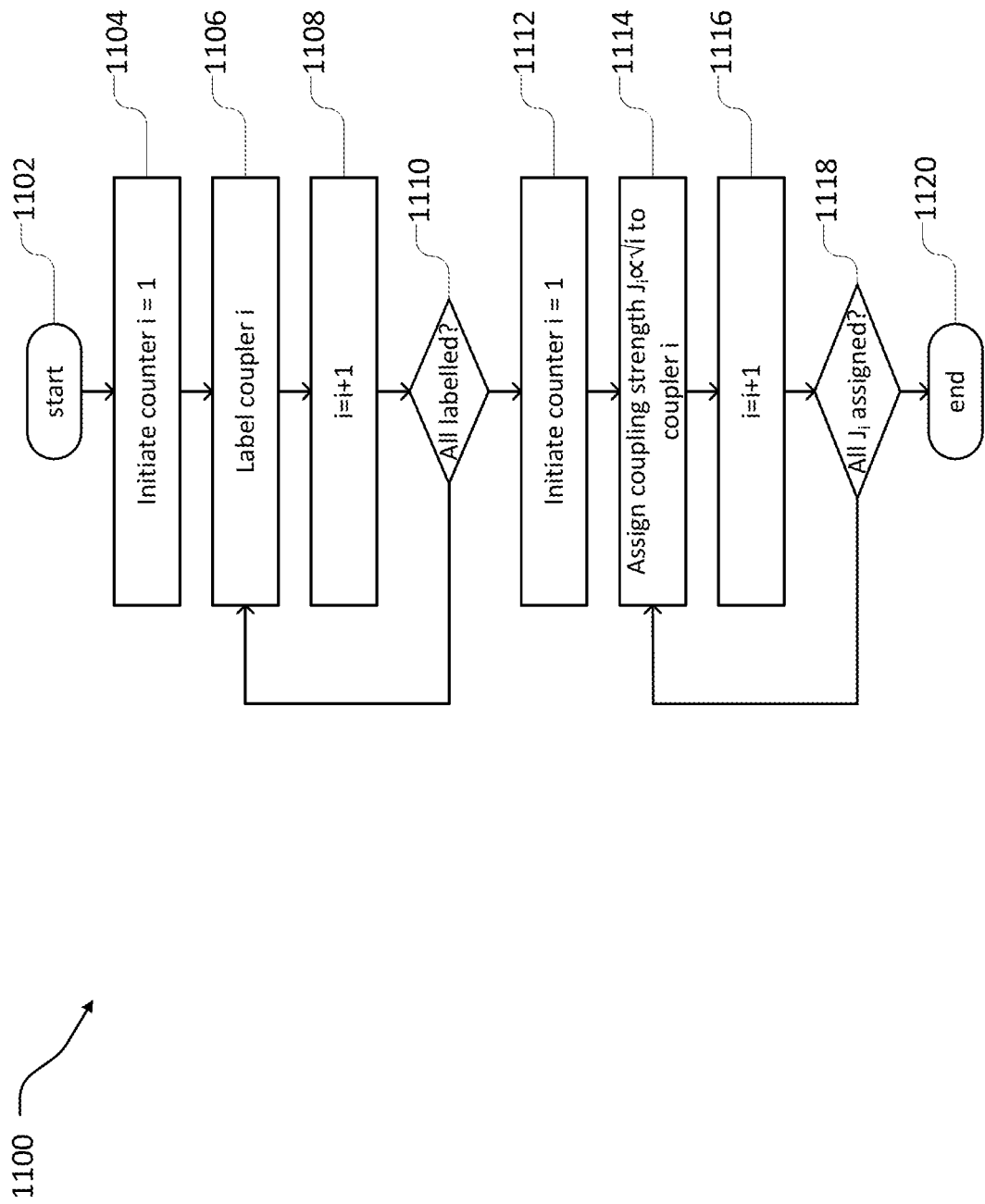
FIG. 11 is a flow chart of an example method for choosing individual coupling strengths for couplers in chains of qubits for attempting to minimize the overall coupling strengths of a chain while reducing broken chains.

FIG. 11 is a flow chart of an example method 1100 for choosing individual coupling strengths for coupler in chains of qubits for attempting to minimize the overall coupling strengths of a chain while reducing broken chains. Method 1100 will be described with reference to linear chains of qubits (i.e., chains where each qubit is communicatively coupled to at most two other qubits in the same chain) of length N. The length of a linear chain may be defined as the number of qubits in the chain, e.g., a chain of length N has N qubits and N−1 couplers.

Method 1100 comprises acts 1102-1120. It will be appreciated that the depicted method 1100 is exemplary and, in some implementations, certain acts may be omitted, further acts may be added, and/or the order of the acts may be changed. Method 1100 may be implemented via a hybrid computing system comprising an analog processor and a digital processor. The analog processor may be a quantum processor.

Method 1100 starts at 1102, for example in response to a call from another routine. A set of inputs, including a linear chain of qubits of length N may be received.

At 1104 the hybrid computing system initiates a counter $i$ to $i=1$.

At 1106, the hybrid computing system labels the couplers in the linear chain of qubits so that the first coupler of the chain is labelled $i$.

At 1108, the counter is incremented to $i=i+1$.

At 1110, the hybrid computing system checks whether all the couplers in the linear chain of qubits have been labelled. In at least one implementation, the hybrid computing system check the condition $i=N$, where N is the number of qubits. If all the couplers have been labelled, control passes to 1112, otherwise to 1106, where the next coupler in the linear chain of qubits is labelled.

At 1112, the hybrid computing system initializes the counter back to $i=1$.

At 1114, the hybrid computing system assigns a coupling strength $J_i$ to the $i^{th}$ coupler as follows. For the $i^{th}$ coupler, there are $i$ qubits to the left of the $i^{th}$ coupler and $N-i$ qubits to the right of the $i^{th}$ coupler. For random problems, the median expected bias on the left portion of the chain ($i$ qubits) is proportional to $\sqrt{i}$ and the median expected bias on the right portion of the chain ($N-i$ qubits) is proportional to $\sqrt{N-i}$. Chains may break in the ground state when $|\sqrt{N-i}-\sqrt{i}|>J_i$, where $J_i$ is the coupling strength assigned to the $i^{th}$ coupler. Thus by assigning coupling strength $J_i \propto \sqrt{i}$ to the $i^{th}$ coupler, the likelihood of chain breakage in a ground state of the system may be reduced. This ensures that, rather than a common chain strength value $J_{chain}$, each coupler in the linear chain of qubits is assigned an individual coupling strength $J_i$ such that $\Sigma_i J_i < (N-1)J_{chain}$ is respected, which may offer an advantage in lowering the effective temperature of the linear chain of qubits and/or causing later freezeout.

In at least one implementation, the hybrid computing system assigns to the $i^{th}$ qubit a coupling strength of the form:

$$J_i = a\left(-1 + \sqrt{1 - \frac{|n/2 - i|}{n/2}}\right) + J_{chain}$$

Where n is the length of the chain of qubits and a is an amplitude function.

At 1116, the hybrid computing system increments the counter to i=i+1.

At 1118, the hybrid computing system checks whether all the couplers in the linear chain of qubits have been assigned an individual coupling strength. In at least one implementation, the hybrid computing system check the condition i=N, where N is the number of qubits. If all the couplers have been assigned an individual coupling strength, control passes to 1120, otherwise to 1114, where the next coupler in the linear chain of qubits is assigned an individual chain strength.

Method 1100 terminates at 1120, until it is for example invoked again.

Method 1100 may be extended to non-linear chains, i.e., chains where one or more qubits are communicatively coupled to more than two other qubits. In the case of non-linear chains, the individual $J_i$ assigned to a qubit i will be based on the satisfying the condition $J_i \propto \sqrt{n_l} - \sqrt{n_r}$, where $n_l$ represents the number of qubits on a first half of the chain of qubits, e.g., qubits on the left of the $i^{th}$ qubit, and $n_r$, represents the number of qubits on a second half of the chain of qubits, e.g., qubits on the right of the $i^{th}$ qubit.

The present systems, methods and apparatus comprise techniques for submitting problems to an analog processor by increasing coupling strength only at locations where a chain is likely to break.

Figure 12:
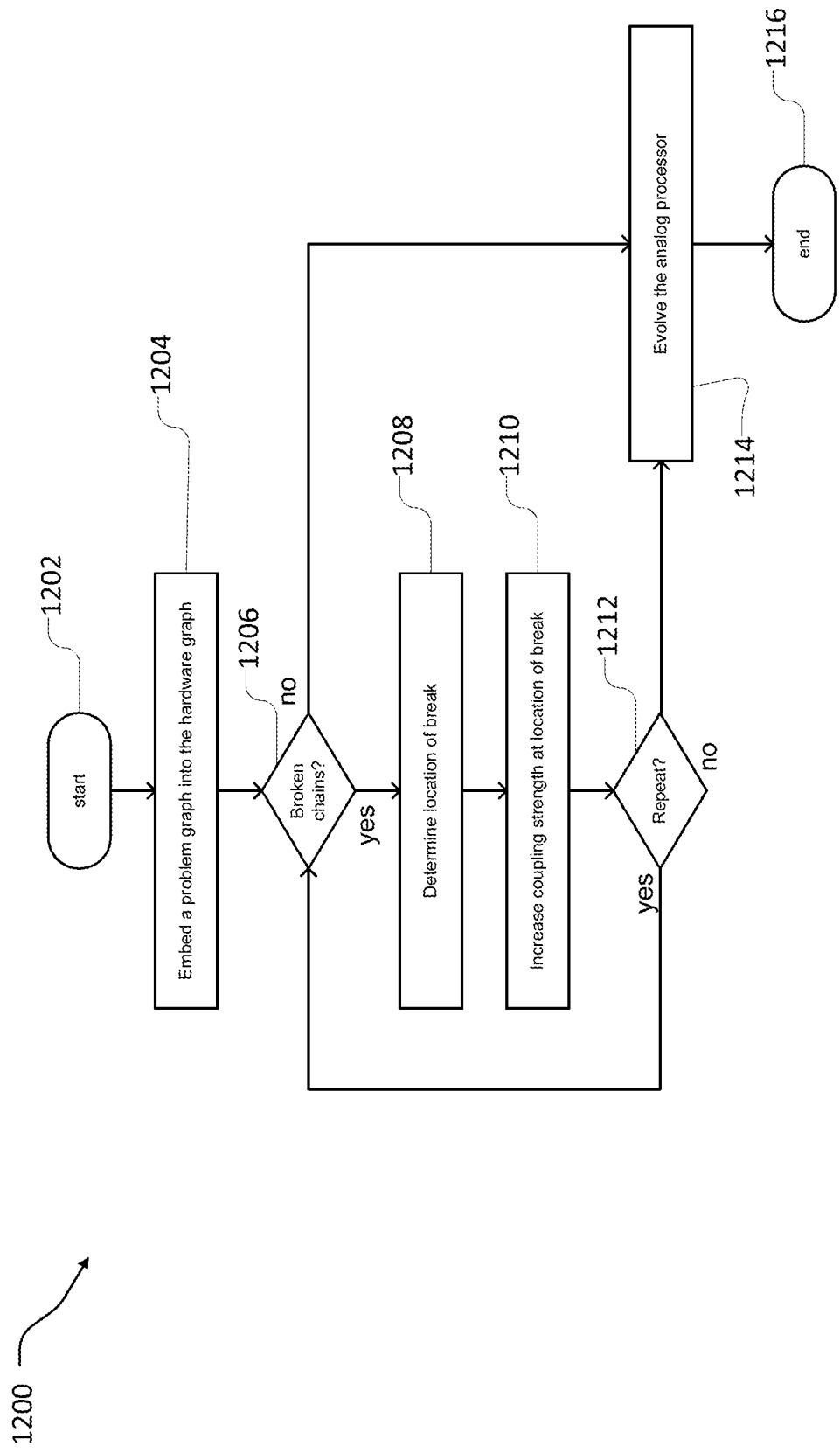
FIG. 12 is a flow cart of an example method for increasing coupling strengths at couplers where a chain of qubits breaks.

FIG. 12 is a flow cart of an example method 1200 for increasing coupling strengths at couplers where a chain of qubits breaks.

Method 1200 comprises acts 1202-1216. It will be appreciated that the depicted method 1200 is exemplary and, in some implementations, certain acts may be omitted, further acts may be added, and/or the order of the acts may be changed. Method 1200 may be implemented via a hybrid computing system comprising an analog processor and a digital processor. The analog processor may be a quantum processor.

Method 1200 starts at 1202, for example in response to a call from another routine. A set of inputs, including a problem graph may be submitted to the hybrid processor.

At 1204, the hybrid computer finds an embedding for the problem graph into the hardware graph of the analog processor. This embedding may include one or more chains of qubits. Any suitable method for embedding a problem graph into a hardware graph may be employed, including methods described this specification and in U.S. Pat. Nos. 7,984,012, 8,244,662 and 9,501,474.

At 1206, the hybrid computing system determines whether one or more chains in the embedded problem graph is broken. Any suitable method may be employed to determine if there are broken chains, including, but not liming to, taking samples from the analog processor. If one or more chains are broken control passes to 1208, otherwise to 1214.

At 1208, the hybrid computing system determines the location of the break in each of the broken chains determined at 12006. A chain may be broken in one or more location, e.g. more than two groups of qubits in a chain may not take the same spin. Any suitable method for determining the location of the break may be employed, including, but not limited to, taking samples of the individual qubit's spin values in a chain.

At 1210, the hybrid computing system increases the coupling strength at the location of the break in each of the locations determined at 1208. The amount coupling strength to be increased may be determined by any suitable method, including, but not limited to, method 400 of FIG. 4 or method 1100 of FIG. 11.

At 1212, the hybrid computing system determines whether to repeat testing for broken chains. The hybrid computing system may iterate for a predetermined number of times, or until there are no more broken chains in the embedded problem. If the hybrid computing system determines to keep testing for broken chains, control passes to 1206, otherwise to 1214.

At 1214, the hybrid computing system causes the analog processor to evolve until a low energy state. The hybrid computing system may cause the analog processor to evolve non-uniformly across the hardware graph, e.g., start the evolution in a first location of the topology of the analog processor later than in a second location, pause the evolution for a time interval before resuming, or cause the evolution to proceed at a faster or slower rate during the evolution.

Method 1200 terminates at 1216, until it is for example, invoked again.

The above description of illustrated embodiments, including what is described in the abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. All of the U.S. patents, U.S. patent application publications, U.S. patent applications, International (PCT) patent applications referred to in this specification and/or listed in the Application Data Sheet including but not limited to U.S. Pat. Nos. 8,073,808; 7,984,012; 8,244,662; 8,190,548; 7,870,087; 8,032,474, International Patent Application WO2006066415, U.S. Pat. No. 9,178,154, US Patent Publication 2008/0052055, U.S. Pat. Nos. 9,170,278 and 9,501,474 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for assigning coupling strengths to couplers in chains of qubits in a hardware graph of an analog processor via a hybrid processor comprising a digital processor and the analog processor, the method comprising:

embedding a problem graph into the hardware graph of the analog processor to produce an embedded problem graph, the embedded problem graph containing at least one chain of qubits;

determining via the digital processor whether the at least one chain in the embedded problem graph is broken;

if the at least one chain is broken, determining via the digital processor a location of a break in the at least one chain; and increasing respective coupling strengths of couplers in the analog processor at the location of the break by finding an upper-bound on a required chain strength by verifying that for each chain C of the embedded problem $-J(e) > b(C, e)$ is respected for each edge e in C, wherein $b(C, e)$ is defined as $b(C, e) := \min\{b(C_1(e)), b(C_2(e))\}$ and $b(C) := \Sigma_{v \in C}|h(v)| + \Sigma_{v \in C}\Sigma_{u \in U_v}|J(v, u)|$ and $J(e)$ is the coupling strength applied to edge e.

2. The method of claim 1 wherein determining via the digital processor whether the at least one chain in the embedded problem graph is broken includes receiving via the digital processor samples from the analog processor.

3. The method of claim 1 further comprising:
causing the analog processor to evolve following a non-uniform annealing schedule across the hardware graph of the analog processor.

4. The method of claim 3 wherein causing the analog processor to evolve following a non-uniform annealing schedule across the hardware graph of the analog processor includes causing the analog processor to pause evolving for a time interval before resuming evolving.

5. The method of claim 3 wherein causing the analog processor to evolve following a non-uniform annealing schedule across the hardware graph of the analog processor includes causing the analog processor to evolve according to a non-linear rate of evolution.

6. The method of claim 1 further comprising:
iteratively repeating until an exit condition is met:
sampling from the analog processor via the digital processor;
determining via the digital processor whether the at least one chain in the embedded problem graph is broken;
if the at least one chain is broken, determining via the digital processor the location of the break; and
increasing the respective coupling strengths of couplers in the analog processor at the location of the break.

7. A hybrid computing system, comprising:
an analog processor into which a problem is embeddable, the problem representable as a problem graph and the analog processor representable as a hardware graph comprising chains of qubits communicatively coupled by couplers;

a digital processor in communication with the analog processor, wherein in operation the digital processor:

embeds the problem graph into the hardware graph of the analog processor to produce an embedded problem graph, the embedded problem graph containing at least one chain;

determines via the digital processor whether the at least one chain in the embedded problem graph is broken;

if the at least one chain is broken, determines via the digital processor a location of a break in the at least one chain; and increases respective coupling strengths of one or more of the couplers in the analog processor at the location of the break by finding an upper-bound on a required chain strength by verifying that for each chain C of the embedded problem $-J(e) > b(C, e)$ is respected for each edge e in C, wherein $b(C, e)$ is defined as $b(C, e) := \min\{b(C_1(e)), b(C_2(e))\}$ and $b(C) := \Sigma_{v \in C}|h(v)| + \Sigma_{v \in C}\Sigma_{u \in U_v}|J(v, u)|$ and $J(e)$ is the coupling strength applied to edge e.

8. The hybrid computing system of claim 7 wherein in operation the digital processor receives samples from the analog processor to determine whether the at least one chain in the embedded problem graph is broken.

9. The hybrid computing system of claim 7 wherein in operation the digital processor further causes the analog processor to evolve following a non-uniform annealing schedule across the hardware graph of the analog processor.

10. The hybrid computing system of claim 9 wherein in operation the digital processor causes the analog processor to evolve following a non-uniform annealing schedule by evolving for a time interval before resuming evolving.

11. The hybrid computing system of claim 9 wherein in operation the digital processor causes the analog processor to evolve following a non-uniform annealing schedule by evolving according to a non-linear rate of evolution.

12. The hybrid computing system of claim 7 further comprising in operation the digital processor iteratively repeating until an exit condition is met:
sampling from the analog processor via the digital processor;
determining via the digital processor whether the at least one chain in the embedded problem graph is broken;
if the at least one chain is broken, determining via the digital processor the location of the break; and
increasing the respective coupling strengths of one or more of the couplers in the analog processor at the location of the break.

* * * * *